US008155989B2

(12) United States Patent
Baskin et al.

(10) Patent No.: US 8,155,989 B2
(45) Date of Patent: Apr. 10, 2012

(54) ENGINEERED MANAGEMENT SYSTEM PARTICULARLY SUITED FOR MAINTENANCE AND REPAIR (M AND R) MANAGEMENT OF STRUCTURE SUCH AS PAVEMENT

(75) Inventors: Arthur B. Baskin, Indianapolis, IN (US); Mohamed Y. Shahin, Fort Collins, CO (US); Robert E. Reinke, Indianapolis, IN (US)

(73) Assignee: The United States of America as represented by the Secretary of the Army, Washingtin, DC (US)

( * ) Notice: Subject to any disclaimer, the term of this patent is extended or adjusted under 35 U.S.C. 154(b) by 677 days.

(21) Appl. No.: 12/287,454

(22) Filed: Oct. 9, 2008

(65) Prior Publication Data
US 2010/0235203 A1    Sep. 16, 2010

Related U.S. Application Data

(60) Provisional application No. 60/999,233, filed on Oct. 17, 2007.

(51) Int. Cl.
*G06Q 10/00* (2006.01)
(52) U.S. Cl. .......................... 705/7.12; 705/7.13; 702/33
(58) Field of Classification Search ........................ None
See application file for complete search history.

(56) References Cited

U.S. PATENT DOCUMENTS

| | | | |
|---|---|---|---|
| 5,189,606 A | 2/1993 | Burns et al. | |
| 6,032,123 A | 2/2000 | Jameson | |
| 6,038,393 A | 3/2000 | Iyengar et al. | |
| 6,397,202 B1 | 5/2002 | Higgins et al. | |
| 6,556,924 B1 | 4/2003 | Kariyawasam et al. | |
| 6,584,414 B1* | 6/2003 | Green et al. | 702/33 |
| 6,615,648 B1 | 9/2003 | Ferguson et al. | |
| 6,892,204 B2 | 5/2005 | Haas et al. | |
| 7,188,016 B2 | 3/2007 | Flores et al. | |
| 7,249,134 B2 | 7/2007 | Simonin | |
| 7,769,568 B2* | 8/2010 | Marrano et al. | 703/2 |
| 2003/0212778 A1 | 11/2003 | Collomb | |
| 2006/0009935 A1* | 1/2006 | Uzarski et al. | 702/81 |
| 2006/0020789 A1* | 1/2006 | Gipps et al. | 713/167 |
| 2006/0036378 A1 | 2/2006 | Smith et al. | |
| 2007/0033077 A1* | 2/2007 | Grussing et al. | 705/7 |

OTHER PUBLICATIONS

"Develompent of an Integrated Infrastructure Management System", Zhang, Zhanmin, Hudson, W. Ronald, 4th International Conference on Managing Pavements (1998).* Shahin, M.Y., Pavement Management for Airports, Roads, and Parking Lots, 2d Edition, Springer Science+ Business Media, Inc., New York, NY, USA, 2005.

* cited by examiner

*Primary Examiner* — M. Thein
(74) *Attorney, Agent, or Firm* — Earl H. Baugher, Jr.

(57) ABSTRACT

An automated user-implemented method for optimizing cost, schedule and performance of maintenance and rehabilitation (M&R) on manmade structure, such as pavements. The method utilizes a database containing information on the condition of the manmade structure, the information on condition further including a condition index; applies one or more algorithms to data in the database to yield schedule and budget for M&R of the manmade structure; correlates the type of M&R and schedule for performing the M&R with alternative budgets that a user may enter into the software supporting the method and outputs and displays work plans associated to each of the alternative budgets for use by managers in planning future M&R work and predicting performance thereof by evaluating past work on the manmade structure. The system may be implemented by a user on the internet as well as on individual personal computers. Specific implementations include PAVER™ and microPAVER™ software.

19 Claims, 20 Drawing Sheets

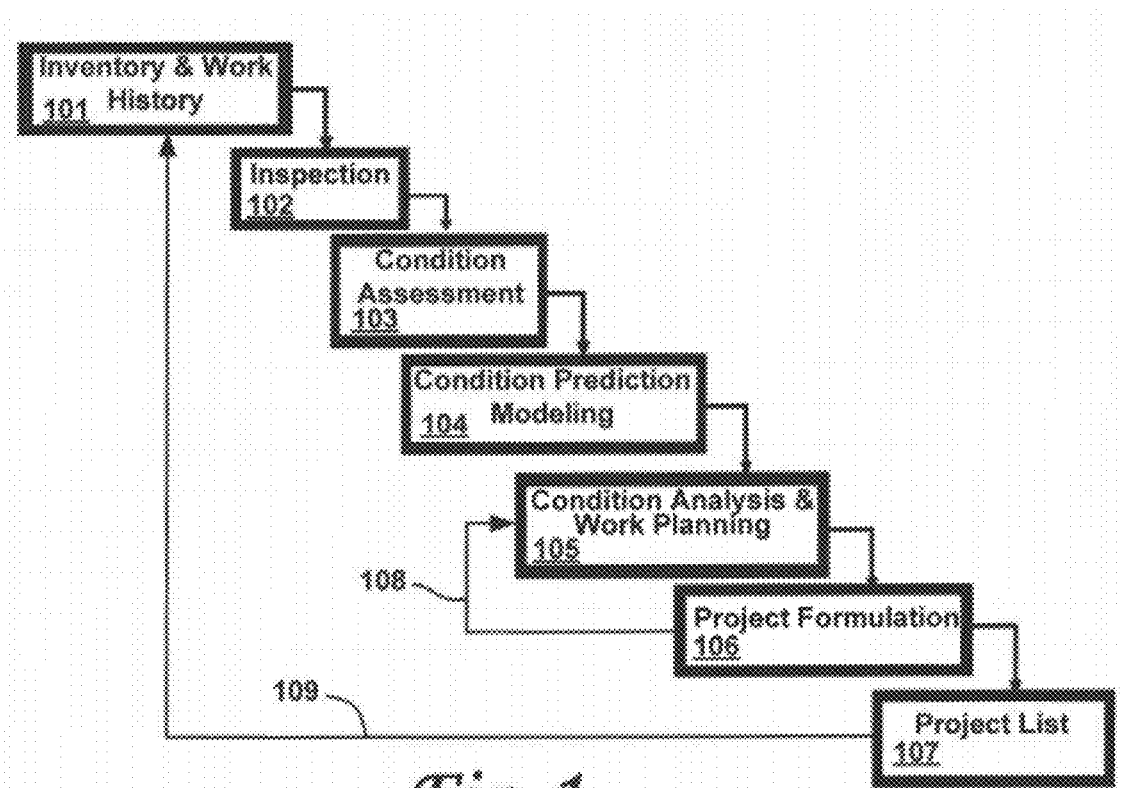
Fig. 1
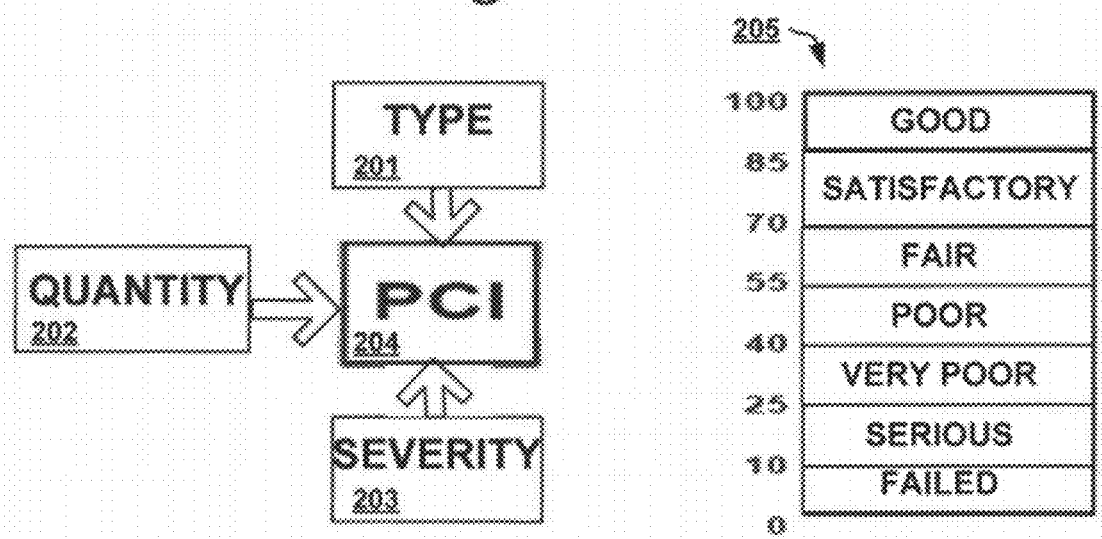
Fig. 2 – Prior Art

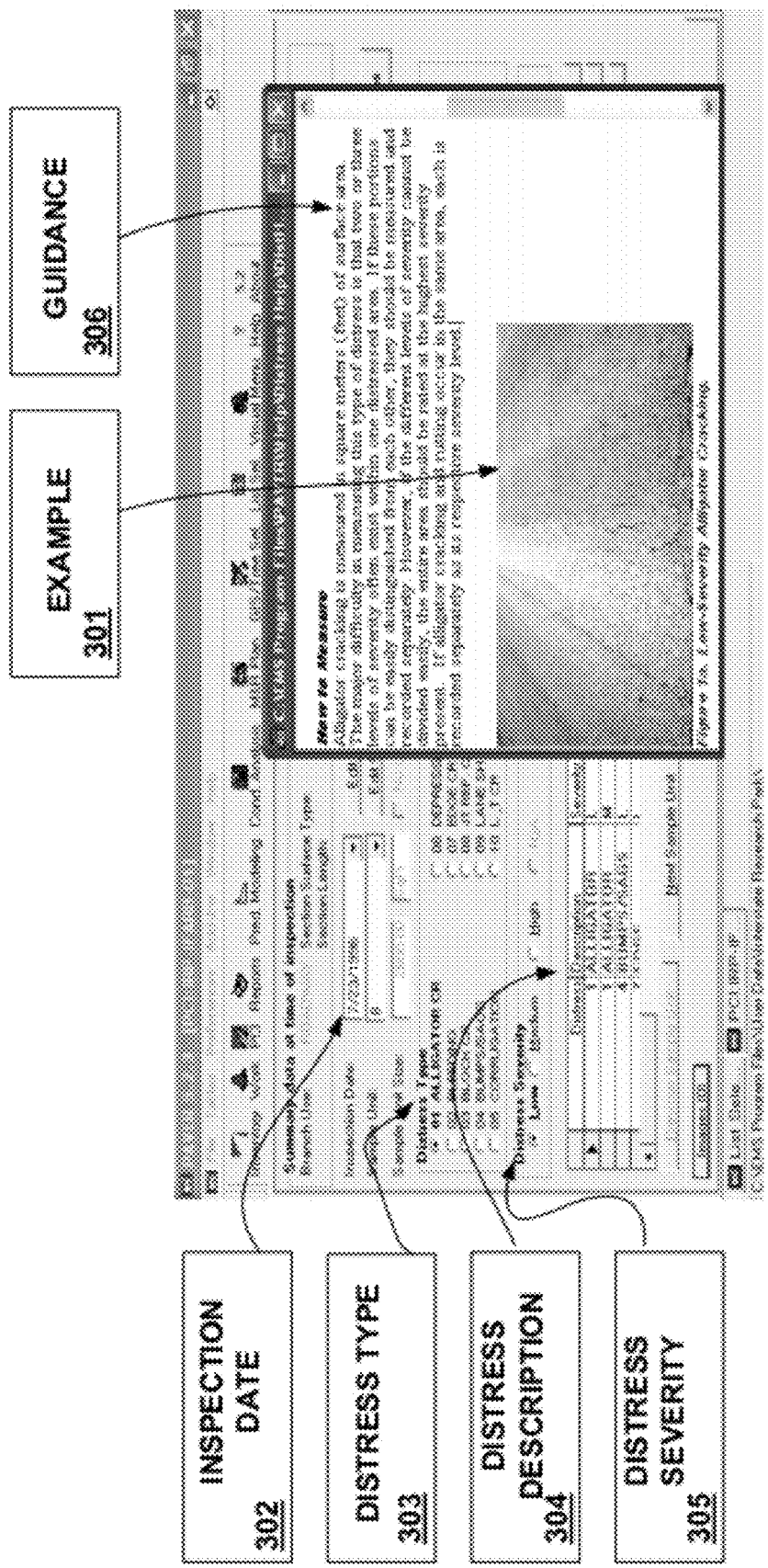
Fig. 3 – Prior Art

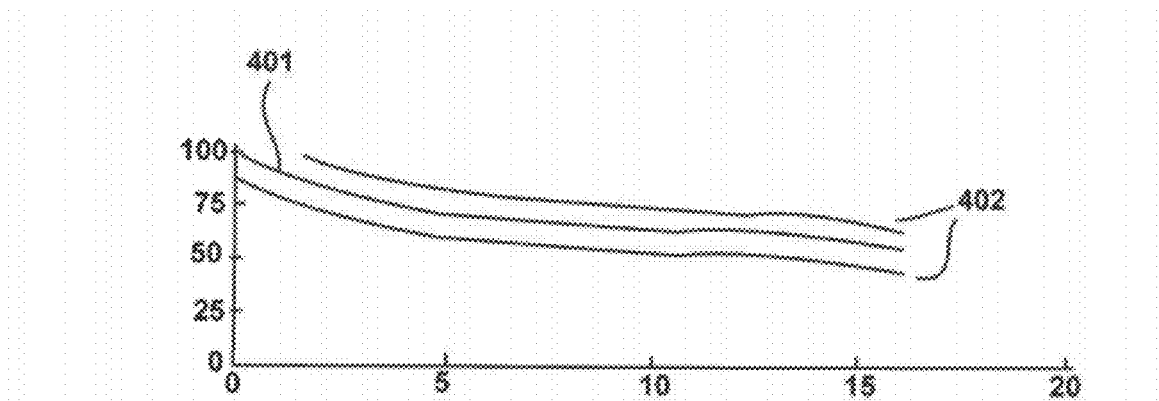
*Fig. 4 – Prior Art*
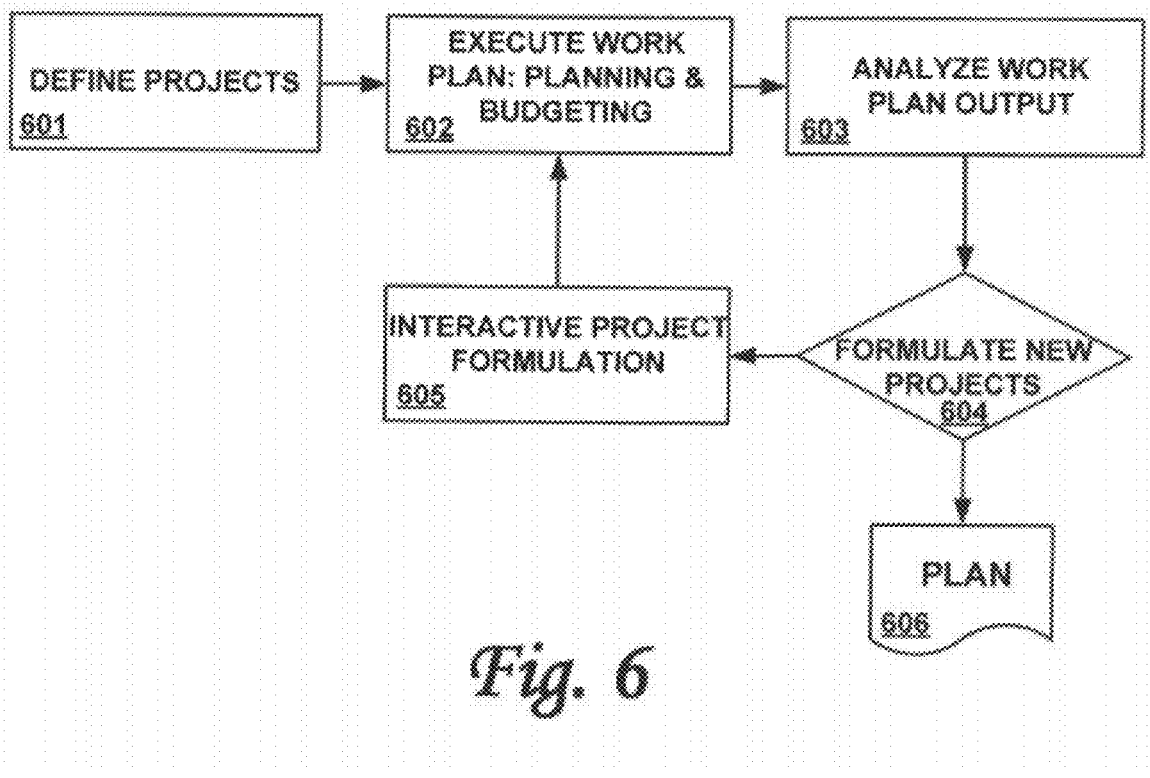
*Fig. 6*

Fig. 5 – Prior Art

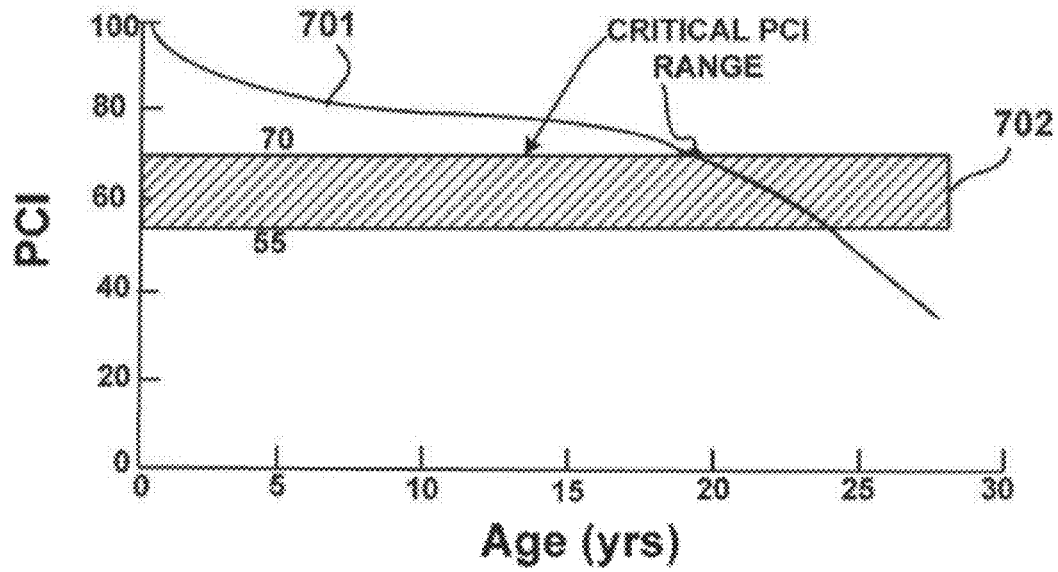
*Fig. 7 – Prior Art*
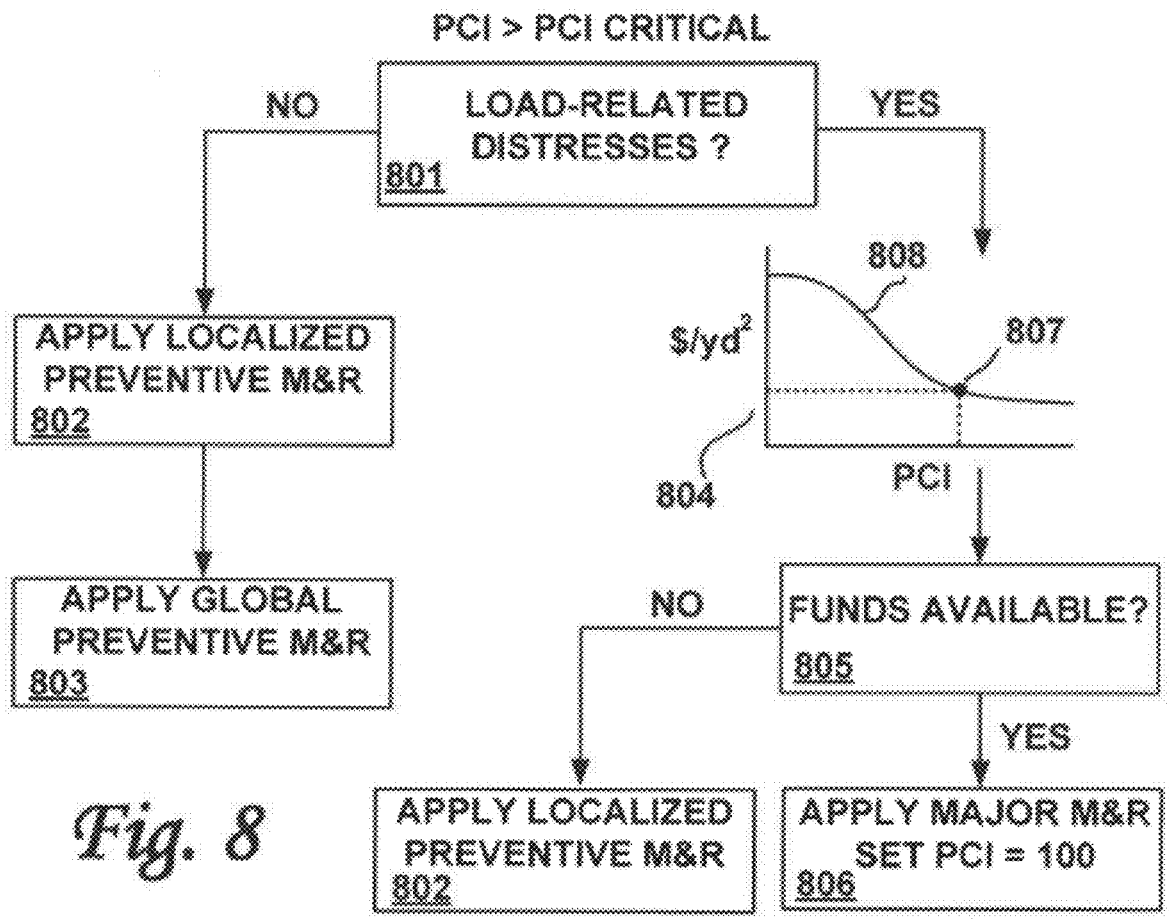
*Fig. 8*

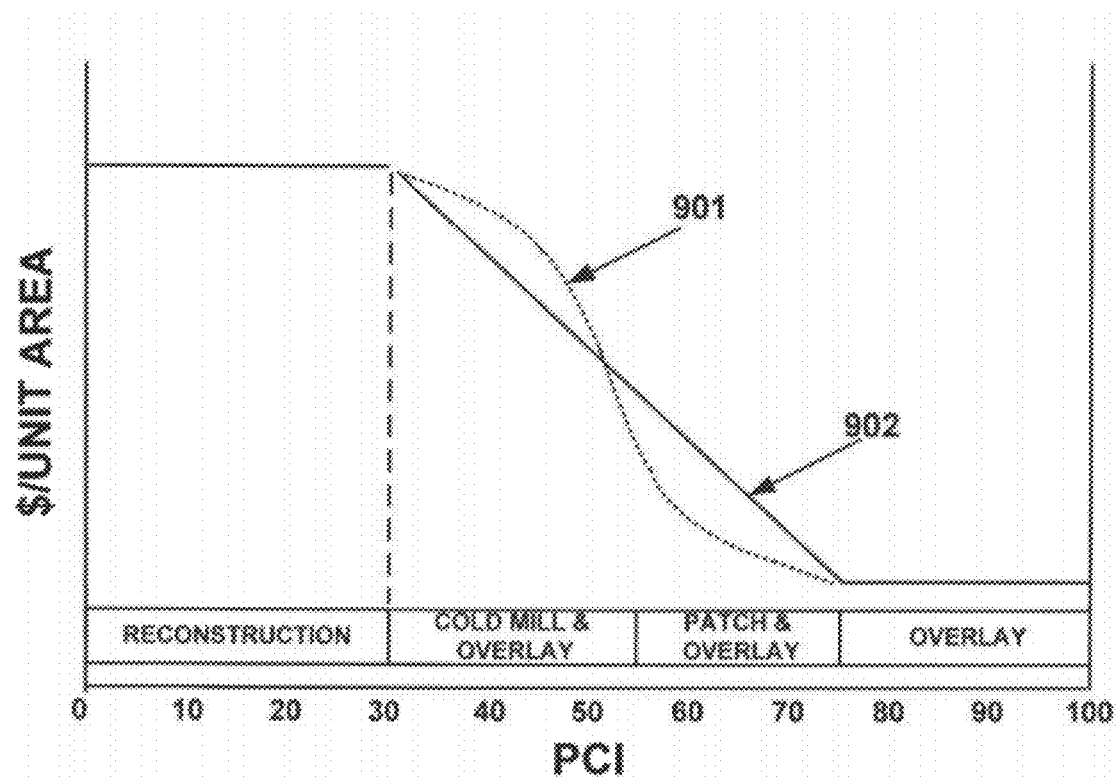
Fig. 9 – Prior Art
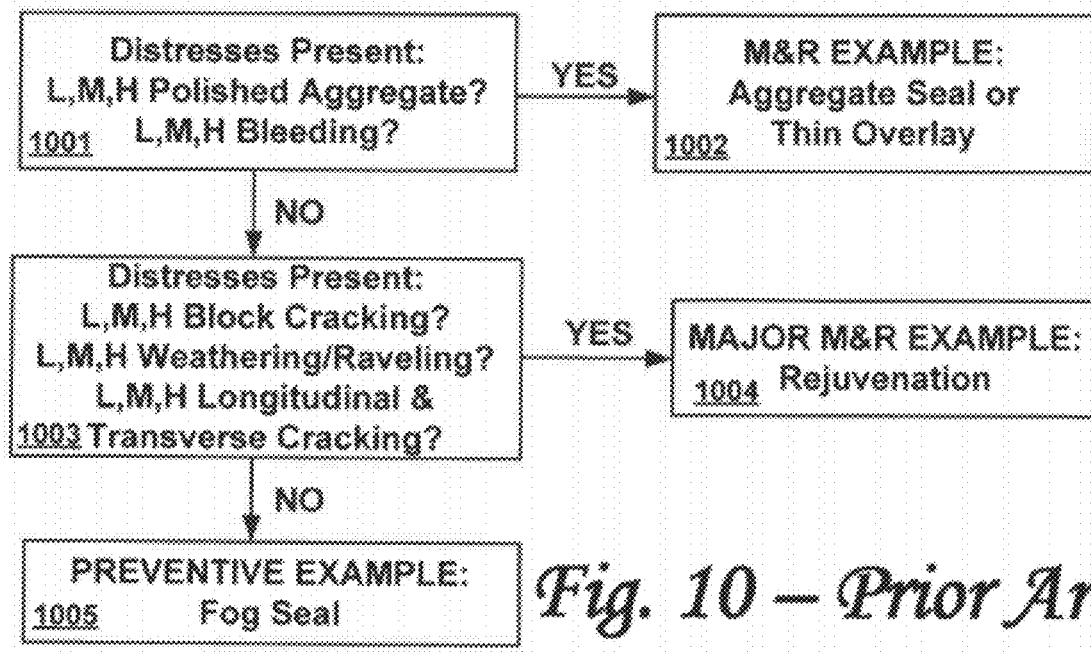
Fig. 10 – Prior Art

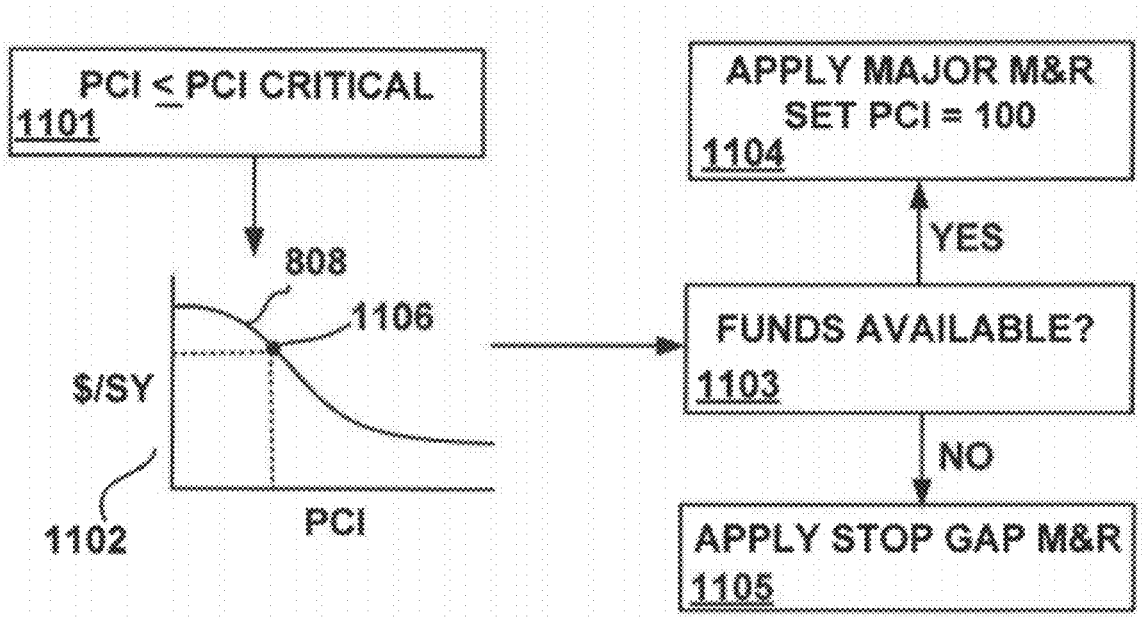
*Fig. 11 – Prior Art*
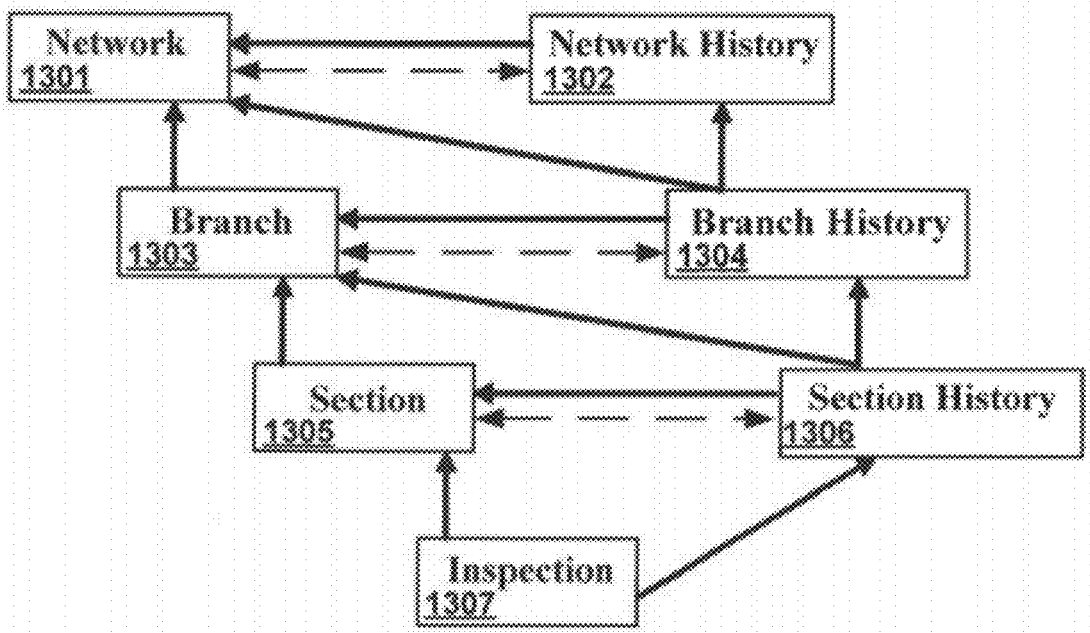
*Fig. 13*

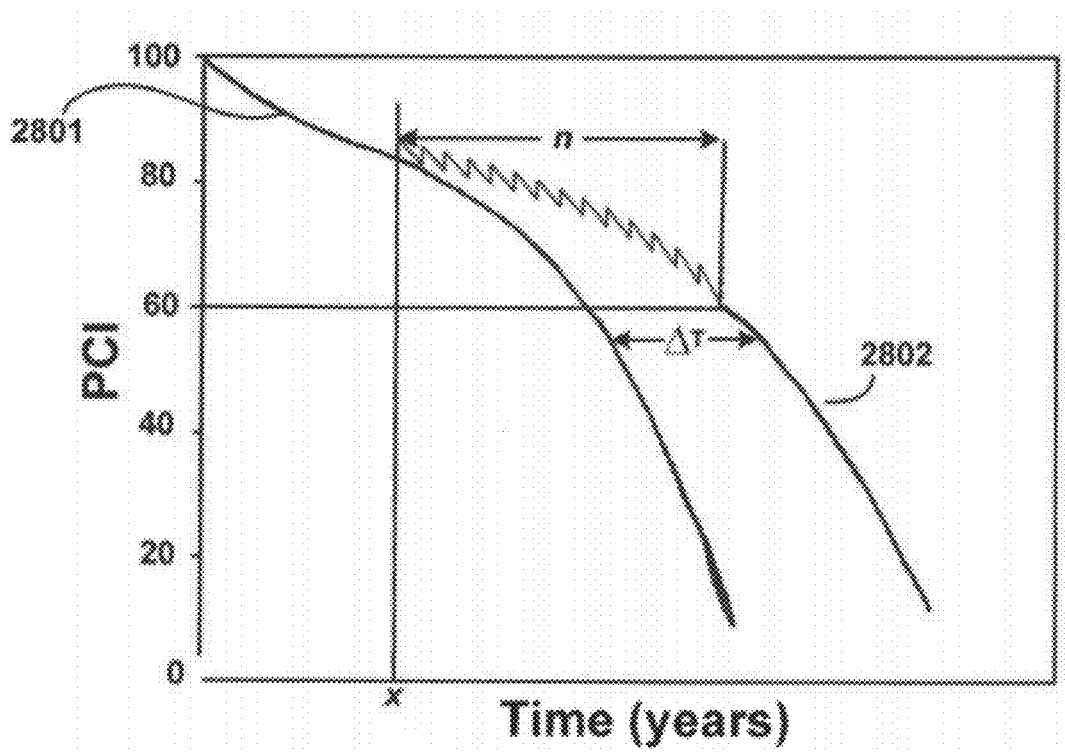
*Fig. 28 – Prior Art*
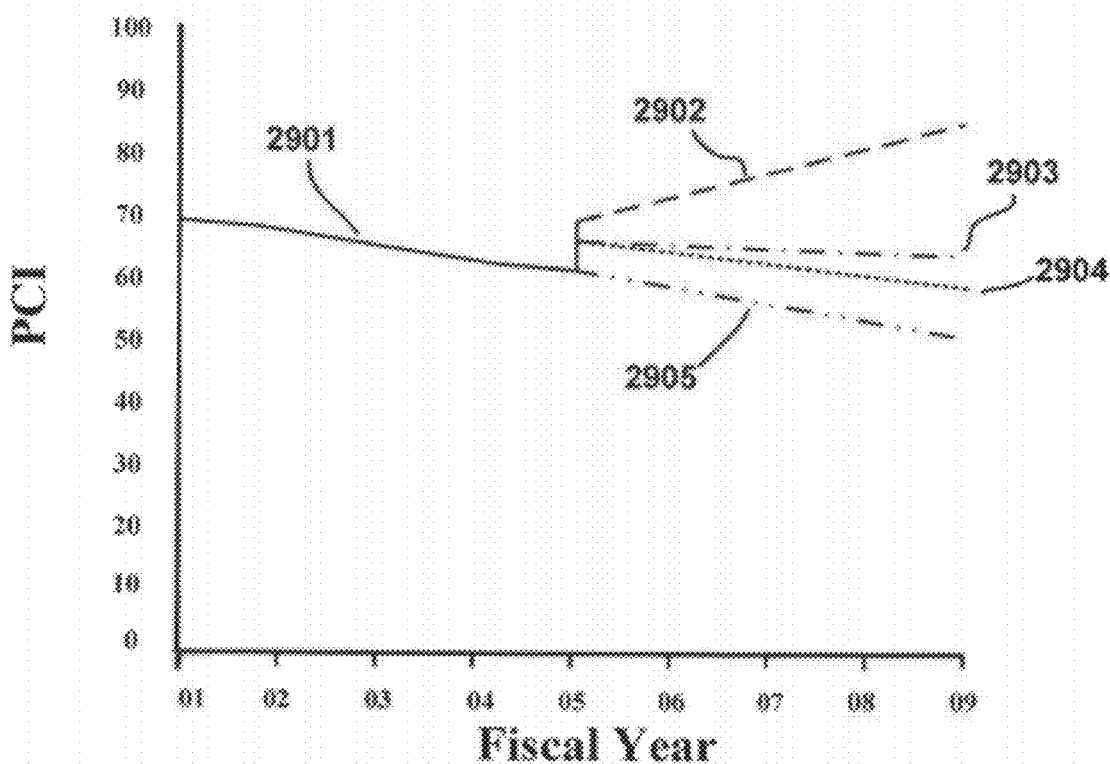
*Fig. 29 – Prior Art*

ENGINEERED MANAGEMENT SYSTEM PARTICULARLY SUITED FOR MAINTENANCE AND REPAIR (M AND R) MANAGEMENT OF STRUCTURE SUCH AS PAVEMENT

RELATED APPLICATIONS

Under 35 U.S.C. §119(e)(1), this application claims the benefit of prior co-pending U.S. Provisional Patent Application Ser. No. 60/999,233, Engineered Management System Particularly Suited for Operation and Maintenance (O&M) Management Of Structure Such As Pavement, by Shahin et al., filed Oct. 17, 2007, and incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees. Please contact Bea Shahin at 217 373-7234.

BACKGROUND

Airfield and roadway pavements are deteriorating faster than they are being repaired. In the past, pavements were maintained but not managed, and little regard was given either to life cycle costing or to priority, as compared to other requirements. Letting pavements deteriorate without preventive maintenance is very costly and results in an increased backlog and eventually a loss of assets. As pavement infrastructure has proliferated and aged, a more systematic approach to determining maintenance and rehabilitation (M&R; alternatively: repair) needs and priorities became necessary. Optimum timing of repairs results in improved pavement condition and considerable cost savings over the life of the system. If M&R is performed during the early stages of deterioration, i.e., before the sharp decline in pavement condition, over 50% of lifecycle repair costs are saved. In addition to cost reduction, long periods of closure to traffic and detours can be avoided.

PAVER™ (consisting of a desktop system called Micro-PAVER™ and a Web-based system called WebPAVER™) is a successful engineered management system (EMS) for pavements. PAVER™ was developed by the US Army Corps of Engineers Engineering Research and Development Center (ERDC), Construction Engineering Research Laboratory (CERL). PAVER™ aids pavement (M&R) managers in deciding when and where to apply resources for pavement M&R. PAVER™ is used to:
  develop and organize pavement inventory;
  assess current pavement condition;
  develop models to predict future conditions;
  document past and estimate future pavement performance;
  develop alternatives for M&R based on budget and pavement condition.

Recent improvements to PAVER™ aid M&R managers in modeling pavement condition and permitting adjustments related directly to budget availability and optimization of available resources down to the project level.

In select embodiments of the present invention, the computer-based Inventory & Work History 101 is based on a prior art hierarchical structure composed of networks, branches, and pavement sections, with user-specified pavement sections being the smallest unit identified for management. This structure allows users to easily organize inventory while providing appropriate fields and levels for storing data. Additional features, such as 'Copy and Move', simplify the process of re-defining existing pavement sections and applying work information to multiple pavement sections at once.

Refer to FIGS. 1 and 2. For Condition Assessment 103, select embodiments of the present invention may use the prior art Pavement Condition Index (PCI) 204 as a standard. Further, the American Society for Testing and Materials International (ASTM, Intl.) has adopted the PCI 204 as a standard for assessment of roads (D-6433-03) and airfields (D-5340-04). The PCI 204 is derived using data from inspections and assessments as to the Type 201, Quantity 202 and Severity 203 of "distresses" in a pre-specified basic pavement section, in turn rolled up into assessments of branches and then, finally, to networks of pavements.

As available in the prior art, the PCI 204 provides both a numerical and a "qualitative" estimate 205 (color-coded in one embodiment but not shown in FIG. 2) of pavement condition on a scale from 0 to 100 using terms from "failed" to "good" as qualitative terms representing numerical ranges of the PCI 204. In addition to the PCI 204, select embodiments of the present invention allow pavement M&R managers to use and create other condition indices, including those based on the principles of the PCI 204. Qualitative ranges 205 for the PCI 204 may be customized and used for reporting analysis results in accordance with user requirements. Manuals (existing in the prior art) for roads and airfields show defect type, severity level definitions, and guidelines for the measuring criteria used by inspectors.

Select embodiments of the present invention also employ a prior art interface for importing inspection data from automated collection resources such as those that may be affixed to a vehicle traveling over the target pavement section(s). Select embodiments of the present invention provide users a prior art interface for recording the results of an inspection and an online user's guide for selecting the type of distress and assigning a severity thereto, thereby facilitating the assessment of all pavement distresses on each pavement section, a typical prior art computer page (screen) of which is shown in FIG. 3.

Refer to FIG. 3, a typical screen print available in the prior art for summarizing inspection results as well as providing definitions, including photos 301 of sample pavement distresses (defects). For example, the screen (FIG. 3) of the MicroPAVER™ Users' Guide shows distress (defect) type 303, severity level definitions 305, and guidelines for measuring criteria 306 as well as photo examples 301 typical of the various types of distresses encountered in pavements. The screen also provides areas for inputting requests such as inspection date 302 and description of noted distresses 304. Thus, for pavements, there exists both an interface for accessing the results of an inspection and a guide suitable for explaining and characterizing types of pavement distress and quantifying severity.

From the prior art, a pavement "family" is defined as a group of pavement sections with similar deterioration characteristics. Shahin, M. Y., *Pavement Management for Airports, Roads and Parking Lots*, $2^{nd}$ Edition, Springer Science+Business Media, Inc., ISBN 0-387-23464-0, 2005. For example, a user may define a pavement family based on several factors including use, rank, surface type, zone, pavement section category, last construction date (LCD), the PCI, and the like. A user may define as many families as required for accurate condition prediction. Data availability may impose a limitation on the number of discrete families that are defined.

Refer to FIG. 7 showing a typical pavement family deterioration curve 701 from the prior art, plotting the PCI versus Age, with a Critical PCI "range" of 55-70 indicated by the hatched area 702. A Critical PCI is the value of PCI at which the rate of PCI loss "noticeably" increases with time, i.e., the slope of the deterioration curve steepens "suddenly." Another way of saying this is that the Critical PCI is the value of PCI for which the cost of applying localized preventive maintenance increases at a significantly greater rate at a PCI beyond that PCI. The first point at which the curve 701 begins to rapidly change slope after a moderate aging period is shown at 703. Thus, the point 703 could be considered "the" Critical PCI if one were to use a single value as opposed to a range of values for the Critical PCI. From the prior art, the following procedure is used to formally establish the Critical PCI for a pavement section:

1. develop a family curve for the pavement section under consideration and visually select a first estimate of Critical PCI (either a fixed figure or a range of figures) based solely on the increase in loss rate;
2. select the Localized Preventive M&R Policy to be used in developing Work Plans;
3. apply the selected policy to the pavement sections under consideration;
4. plot the cost (e.g., $/yd$^2$) of Localized Preventive Maintenance per unit area for each of the pavement sections (as shown in FIG. 8 at 804); and
5. select a Critical PCI based on the findings of steps 1 and 4, supplemented with engineering judgment.

Again refer to FIG. 1. From the prior art, the Condition Analysis & Work Planning framework (feature) 105 allows users to view the condition of an entire network of manmade structure, such as a pavement network, or any specified subset of a network. This feature captures past conditions, including those between inspections that may be based on interpolated values. This feature then enables reporting of projected conditions based on these prediction models. As available from the prior art, outputs from the Condition Analysis and Work Planning framework 105 may be viewed on color-coded 504 Geographic Information System (GIS) maps 501, as shown in FIG. 5 in grey scale, with layer lists 505 that may be selected via user commands 503, some of which are shown for illustration purposes only on the tool bar 502.

As provided in the prior art regarding pavement, M&R types are grouped into four categories, listed in priority order for accomplishing in a timely manner: Localized Safety (Stop-Gap), Localized Preventive, Global Preventive, and Major M&R.

Localized Safety M&R includes the localized distress repair needed to maintain structure, such as pavement, in a safe condition.

Localized Preventive M&R is defined as distress maintenance activities performed with the primary objective of slowing the rate of deterioration. For pavement, these activities include crack sealing, patching and the like.

Global Preventive M&R includes activities applied to a basic managed element, such as an entire pavement section, with the primary objective of slowing the rate of deterioration. For pavement, these M&R activities are primarily for asphalt surfaced pavements, e.g., surface treatments such as fog and slurry seals.

Major M&R includes activities applied to a basic managed element, such as an entire pavement section, to correct or improve existing structural or functional requirements and specifically includes reconstruction and structural overlays. After completing a Major M&R activity, the PCI is re-set to 100.

A prior art Work Plan tool facilitated automated planning, scheduling and budgeting, as well as analysis of alternative pavement M&R activities. A resultant M&R (Work) plan combined basic inventory data with inspection data, maintenance policies, maintenance costs, and predictions of condition, such as may be associated with M&R of pavement. Factors used in determining a user's required M&R include integration of local M&R management practices such as pavement M&R practices.

As shown in FIG. 29, prior art work planning has enabled users to determine how much funding is required to address alternative objectives such as maintaining a current index, such as a PCI, or eliminating backlog. In this example, condition history was documented to establish the PCI v. Fiscal Year (Age) curve 2901. As is apparent, the PCI has fallen from 70 in Year 01 to about 60 in Year 05. Options are considered at Year 05. For this example, the very best condition maintenance is that shown at curve 2902 for which $1.9M/yr is allocated to M&R. As a result of allocating this much to the budget, the M&R backlog is eliminated by Year 09 and the pavement condition improved to a PCI of about 85 in Year 09. The next best condition maintenance alternative, shown in curve 2903, maintains an almost level condition, i.e., maintains the PCI at about 65 until Year 09. This results in a Year 09 PCI that is just slightly better than the "starting" PCI at Year 05. The cost of M&R for this alternative is $800K/yr. The alternative shown at curve 2904 shows the Year 09 PCI just below that at which it began in Year 05. This is achieved by maintaining M&R funding at $500K/yr, the same level as spent in the Year 05. Finally, a "stop gap" alternative is shown at curve 2905. This amount of M&R allows the pavement to degrade at the same rate as before Year 05 by fixing only what requires fixing to safely operate.

As provided in the prior art, results of a manual budget analysis in analyzing a Work Plan output include recommending an M&R category for each basic element, such as a pavement section, for each planning year. Considering economy of scale, it is unlikely that a project will be generated for each basic element. Instead, basic elements, such as pavement sections, are grouped to formulate projects that reduce unit cost and minimize interruption. Also when formulating projects, work is specified in terms of M&R type (e.g., 3-inch overlay for a pavement) rather than by M&R category (e.g., major M&R). Each project may be described by: project name and pavement sections included in the project; M&R types to be performed, assigning each a work date and cost per unit area; altering work items for individual pavement sections, if different from the rest of the sections to be included in a project; and the like.

Based on the concept that it is more economical to maintain pavements above rather than below a critical PCI, a Critical PCI procedure for Work Planning of pavement M&R was developed in the prior art by applying results from a dynamic programming network optimization analysis and life-cycle cost analyses from many projects. As considered in Work Planning, the procedure assigns an appropriate M&R category to individual pavement sections as a function of the PCI of the pavement section and its Critical PCI, prioritizes work, determines budget consequence, establishes budget requirements, and the like.

Disciplined employment of a Critical PCI procedure by users results in maintenance of all pavement sections above the Critical PCI value, thus improving M&R management. By keeping pavement sections above the Critical PCI, emphasis is placed on preventive M&R, i.e. Localized Preventive and Global Preventive M&R. When pavements reach the Critical PCI, they should receive Major M&R. However, in many cases, Major M&R can be performed only as soon as funds are made available.

Refer to FIG. 28, a prior art graphical depiction of the value of localized preventive M&R. As recognized in the prior art, the credit (benefit), ΔT, from applying Localized Preventive M&R can be documented. The application of Localized Preventive M&R is not likely to start until several years, i.e., at x, after the last construction or Major M&R date. That is, it is at the $x^{th}$ year normally when Localized Preventive M&R events, such as crack filling and patching, may be required. To credit the improvement in performance of the pavement section, one has to specify the expected total increase in life, ΔT. The specified increase can be assigned based on the maintenance organization's distress maintenance policy and the type, use, and rank of the pavement section itself. The annual increase in life is calculated by dividing ΔT by the number of years, n, during which the Localized Preventive M&R is applied. As shown for curve 2801, there is no annual increase during the early years when no Localized Preventive M&R is applied but the effect on later years may be significant as shown in curve 2802. This data may be used as input to algorithms used in select embodiments of the present invention for establishing alternative budgets, inspection schedules, M&R Work Plans and the like.

As provided in the prior art for multi-year Work Planning, a pavement section may receive different or repeated M&R events based on condition, rate of deterioration, length of the Period called out in the Work Plan, available budget, and the like. A Work Planning tool may account for a limited budget, i.e., the most realistic scenario. A user may prioritize work based on categories of work, pavement use, relative value of the PCI, and the like. For example, Localized Safety work is given a higher priority than Localized Preventive work while a PCI near the Critical PCI merits a higher priority than a PCI of a higher value. Chapter 10, Shahin (2005). Applying Global Preventive M&R or Localized Preventive M&R is likely to increase the life of the pavement section and increase the PCI. Applying Localized Safety M&R is not likely to increase the life of the pavement section or even stabilize the PCI, thus the common term "stop-gap" is used to describe its effect.

As provided in the prior art, assigning an "appropriate" M&R category is a function of whether a PCI of the pavement section is above or below the Critical PCI. If a PCI is above the Critical PCI, Localized Preventive M&R or Global Preventive M&R may be applied to the individual pavement section. Generally, Major M&R is applied if the pavement section is structurally deficient. Typically, if a PCI is below the Critical PCI, either Localized Safety M&R or Major M&R is applied (many times dependent on funding availability) and no Preventive M&R (Localized or Global) is applied. A more detailed description of the assignment process is presented below with examples of how it is implemented.

Refer to FIG. 9, a graph of cost/unit area versus PCI as presented in the prior art. The straight line curve 902 is an approximation of what is a most likely cost as represented by the dotted curved line 901. Major M&R above Critical PCI has higher priority than Major M&R below Critical PCI in order to minimize expense before the rate of deterioration increases. In select embodiments of the present invention, within each M&R category, a priority factor is assigned based on the combination of pavement use and rank, i.e., a functional classification is assigned. Within each M&R category associated with a priority factor there is likely to be more than one pavement section requiring M&R. In these cases, the PCI may be used to break ties. Priority is determined by three prior art tables that may be edited by the user.

The unit cost of Major M&R above the Critical PCI is much less than that for Major M&R below the Critical PCI. For example, one may perform a 2 to 3-inch overlay on a pavement section that is rated above the critical PCI as compared to a cold mill and overlay done at a PCI below the Critical PCI or a reconstruction done at a very low PCI, e.g., below 30. Typically, Major M&R on a pavement section rated above the Critical PCI is performed when there is a structural deficiency or heavier traffic is expected. Of course, Localized Preventive M&R may be provided as a simple overlay for a pavement section rated at a PCI above the upper part of the Critical PCI range.

Refer to FIG. 10, depicting a prior art procedure for selecting the specific type of Global Preventive M&R 803 for asphalt pavements. Global Preventive M&R 803 is applied based on a specified interval between Global Preventive M&R 803 events. For example, if polished aggregate is present or there is any "bleeding" in low (L), medium (M) or high (H) amounts 1001, an appropriate M&R event may be an aggregate seal or thin overlay 1002. However, if the distress (deficiency) is L, M, or H block cracking; L, M, or H weathering or raveling; or L, M, H cracking 1003, then rejuvenation 1004 may be an appropriate Global M&R event. If neither of the above distress categories 1001, 1003 are present, then an appropriate Global Preventive M&R event ent may be a simple fog seal 1005.

Refer to FIG. 11 for a flow chart describing prior art assignment of M&R categories where PCI≦PCI Critical 1101 as picked off point 1106 on the unit cost/PCI curve 808 of the graph 1102, i.e., a case in which the PCI is "marginal." The first step is to check on funding availability 1103 based on budget and major M&R priorities. If funding is available, Major M&R is applied and the PCI re-set 1104 to 100. If funds are not available, Localized Safety (stop-gap) M&R is applied 1105, the PCI most likely remains the same, and funding availability is checked in the following planning years. Again, the cost of Localized Safety M&R is determined based on the PCI vs. unit cost relationship curve 808. The unit cost at the current PCI of the individual pavement section is multiplied by the area of the pavement section to estimate current cost.

Refer to FIGS. 1 and 4. From the prior art, the Condition Prediction Modeling function 104 identifies and groups pavements of similar construction that are subjected to similar traffic, weather, and other factors affecting pavement performance. Historical data on pavement condition are used to build "family models" such as the curve 401, with upper and lower bounds 402, that predict future condition of a group of pavements having similar attributes.

Management objectives are achieved when work is performed on time. Costs increase if scheduled Major M&R for an element, such as a pavement section, is delayed. The amount of increase is a function of the PCI 204 at the time major M&R was scheduled (but not done) and the projected rate of deterioration of the pavement section. In the prior art, the penalty for delaying major M&R is calculated by:

$$\text{Penalty \%} = \left(\frac{C_f - C_s}{C_s}\right) \times 100$$

where:
$C_s$=Cost in originally scheduled year, and
$C_f$=Future Cost=$[M_p(1+i)^n]+L_d$ where:

$M_p$=Major M&R cost at the predicted future condition (after n years)

i=Annual inflation rate n=Time delay (years), and $L_d$=Sum of localized stop-gap repair costs over the delay period The penalty cost is normalized (as above) by dividing it by the original cost ($C_s$) to determine the relative penalty regardless of the size of a pavement section. Shahin (2005). This facilitates use of the penalty figure for prioritization. An example penalty cost calculation follows.

Year 2005 Major M&R (w/PCI=70); $C_s$=$40,650

Year 2008 Major M&R (w/PCI=62); $M_p$=$53,741 i=3%, and n=3

Future Cost (Major M&R); $C_f$=(53,741)(1+0.03)³=$58,724

Localized Safety Cost over the 3-year delay; $L_d$=$2200

$C_f$=58,724+2200=$60,924

$$\text{Penalty Cost \%} = \left(\frac{60,924 - 40,650}{40,650}\right) \times 100 \cong 50\%$$

As can be seen from the prior art, existing methods of "exploring alternatives" are fairly primitive and do not consider the effect of either the completion or delay of current projects on future work and do not allow a user to readily incorporate user-defined projects. Thus a need exists for a better planning methodology.

BRIEF DESCRIPTION OF DRAWINGS

FIG. 1 is a waterfall chart of the Infrastructure Management Methodology used with select embodiments of the present invention.

FIG. 2 is a graphical depiction of the inputs used to establish a Pavement Condition Index (PCI) and a condition chart, both of which are prior art that may be used in select embodiments of the present invention.

FIG. 3 is a screen print of a typical prior art page that a user of select embodiments of the present invention may access for managing the M&R of pavement infrastructure.

FIG. 4 is a graph of PCI versus age showing the range of PCI values in a prior art condition prediction model that may be used to predict the PCI over time for a family of pavements.

FIG. 5 is a screen print of a prior art page integrating GIS data with M&R data that a user of select embodiments of the present invention may access for managing the M&R of pavement infrastructure.

FIG. 6 is a flow chart depicting major steps in implementing a Project Formulation Interactive Work Planning Process as may be used with select embodiments of the present invention.

FIG. 8 illustrates a simple algorithm that may be used in select embodiments of the present invention for managing M&R of a family of pavements as represented by the typical shape of a pavement section family curve.

FIG. 9 depicts a prior art method for selecting work based on the PCI.

FIG. 10 illustrates a prior art process of selecting the specific type of Global Preventive M&R for asphalt pavements as may be used with select embodiments of the present invention.

FIG. 11 illustrates how assignments of M&R categories are made where PCI≦PCI Critical, as is used in the prior art.

FIG. 13 shows a framework used in select embodiments of the present invention for relating various levels of infrastructure as useful for M&R management of structure.

FIG. 28 is a graph depicting a prior art way to quantify the value of preventive M&R in later years as may be used with select embodiments of the present invention.

FIG. 29 is a graph depicting the impact of various budgeting alternatives on the PCI as available from the prior art.

DETAILED DESCRIPTION

Figure 7:
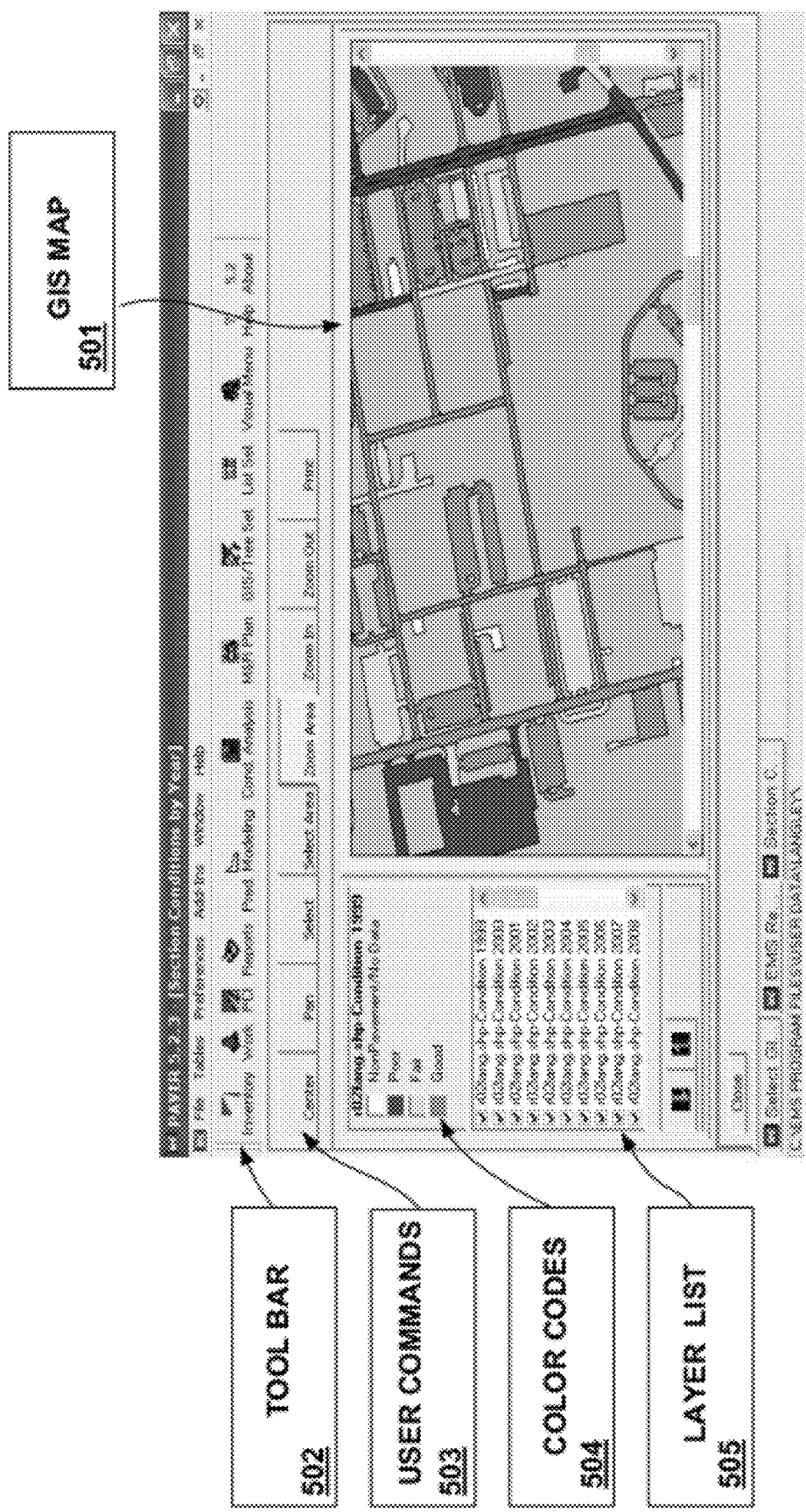
FIG. 7 is a deterioration curve from the prior art showing a typical range for the Critical PCI as may be used in select embodiments of the present invention.

As a consequence of ongoing R&D efforts, a number of improvements to select embodiments of the present invention, i.e., to WebPAVER™ and MicroPAVER™, have been made, enhancing relevance and usability. Some of these improvements include: improvements to the Infrastructure Management Methodology (IMM), a generalized method for calculating alternative condition measures, improvements to the Work Plan (WP) procedure, and calculation of the Last Construction Date (LCD).

Refer to FIG. 1. The backbone of select embodiments of the present invention is the Infrastructure Management Methodology (IMM), comprising seven steps, each of which may be represented with a model: Inventory and Work History 101, Inspection 102, Condition Assessment 103, Condition Prediction Modeling 104, Condition Analysis & Work Planning 105, Project Formulation 106, and Project List 107.

In select embodiments of the present invention, the methodology used with Inventory and Work History 101 includes an inventory component for infrastructure, such as pavements, that tracks the elements of the infrastructure being managed for M&R. The database populated with information from the inventory and work history is used in developing accurate estimates of deterioration rates for the infrastructure at various levels and in identifying logical "families" of distress types and deterioration rates as related to basic structural elements, the latter employed for predicting performance, scheduling inspections and planning and budgeting for M&R of the infrastructure.

In select embodiments of the present invention, the methodology used with Inspection 102 includes techniques for inspecting pre-specified structural inventory elements, such as pavement sections, and recording inspection results. This provides empirical data from which family distress-time (deterioration) or distress-traffic (use) curves are built and modified, from which performance estimates can be interpolated, for setting and modifying inspection schedules, for estimating any unknown construction and major M&R dates, and the like.

In select embodiments of the present invention, the methodology for Condition Assessment 103 includes pre-specified objective methods, including prior art methods, to combine inspection results into an assessment of condition of structure such as pavements.

In select embodiments of the present invention, the methodology for Condition Prediction Modeling 104 includes employing techniques, including prior art techniques, that combine historical assessment results with empirical models useful to predict future condition of structure such as pavements.

In select embodiments of the present invention, the methodology for Condition Analysis and Work Planning 105 includes techniques, including prior art techniques, for employing inspection data and condition prediction models to make maintenance recommendations and cost projections, including alternatives based on budget limitations.

In select embodiments of the present invention, the methodology for Project Formulation 106 includes techniques to support M&R managers (users) in formulating detailed project plans based on the results of condition analysis and work planning, including the consideration of dynamic constraints imposed via various sources.

In select embodiments of the present invention, the methodology for Project Lists 107 provide a final product, a summarized list of projects for use in managing resources to include the provision for providing multiple lists on alternatives as requested by individual users.

Condition Indices

Figure 17:
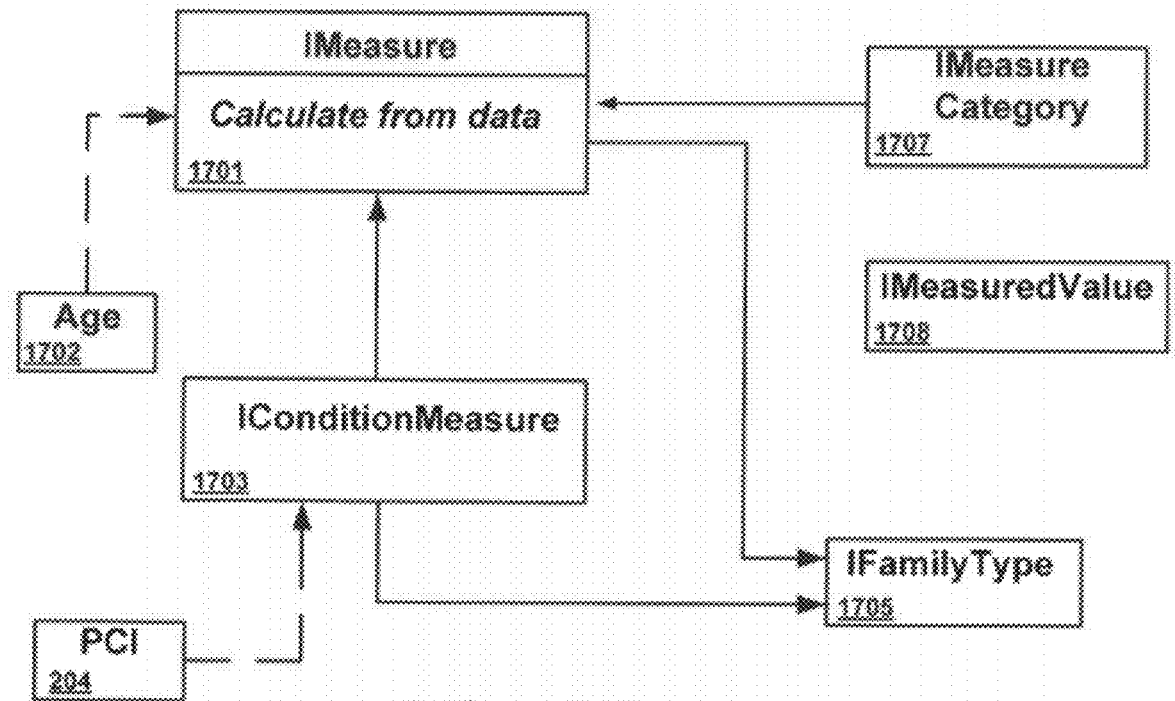
FIG. 17 is a UML class diagram for a model used in select embodiments of the present invention.

Refer to FIG. 17, a Unified Modeling Language (UML) class diagram for a model employed with select embodiments of the present invention. The "I" prefix for the names in select blocks of FIG. 17 indicates that block defines an interface that could be implemented in multiple ways. The concepts of "Measure" and "Condition Measure" are used to formulate a measurement of infrastructure state such as the Pavement Condition Index (PCI) 204 for pavements. Although select embodiments of the present invention are based on a PCI 204, embodiments include support for other indices of condition.

Select embodiments of the present invention use an original domain model to input multiple condition indices and to calculate and predict values for these indices. Select embodiments of the present invention employ the prior art concept of producing a "condition index." A measure of a structure's integrity, such as a pavement condition measure, is a type of data that an evaluator, such as an engineer, might record about a basic element of infrastructure, such as a section of pavement. A particular value of that type of data is represented as an instance of the IMeasuredValue interface 1708. A condition measure, made available by the IConditionMeasure interface 1703, is used as an indicator of condition and may include evaluations of a number ("roll up") of distresses and distress types on a single "evaluated" (inspected) basic element, such as a pavement section. Typically, a numerical (quantitative) condition measure, such as a PCI 204 of a pavement section, has a "perfect" (100) value when a structure is new, and a "failed" value of zero, i.e., the value when the structure has completely failed.

Another concept employed in select embodiments of the present invention is that of Family Type as made available by the IFamilyType interface 1705. A Family Type curve (e.g., PCI vs. time or PCI v. traffic) may be plotted from measured and predicted data and assigned to a category of performance models. For example, a common Family Type curve for pavements establishes a relationship between a PCI 204 and the age of a pavement section for a particular type of pavement, such as asphalt service road, concrete runway, and the like. A performance model of this Family Type for pavements predicts a PCI 204 given the age of the pavement or, conversely, the age of the pavement given a PCI 204. The concept of Family Type is used in implementing prediction modeling. Of course, a PCI 204 may also be derived from actual measurements (e.g., inspections) as made available at the IMeasuredValue interface 1708. A single value of PCI 204 is recorded for an "instance" of the IMeasuredValue interface 1708. The IMeasuredValue interface 1708 may represent either or both an actual or calculated PCI 204 based on distress data. As generally used in select embodiments of the present invention, a Family Type curve for pavement represents predicted values of PCI 204.

Figure 18:
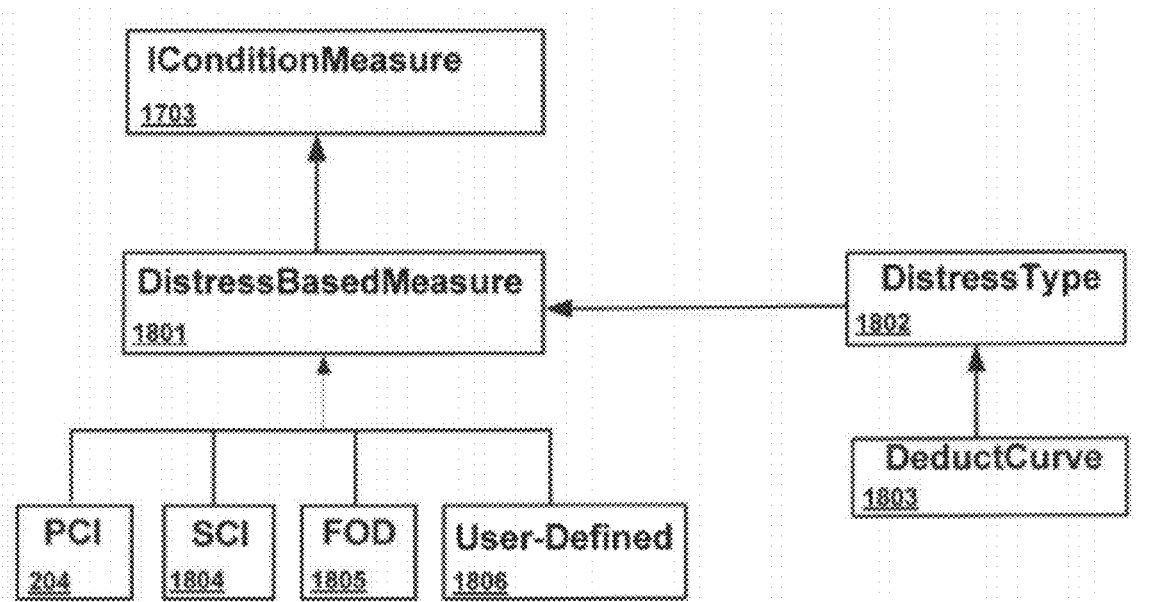
FIG. 18 is a UML class diagram depicting how select embodiments of the present invention extend the model of FIG. 17.

Refer to FIG. 18, a UML class diagram depicting how select embodiments of the present invention extend the "measures" model of FIG. 17. Stored within the DistressType object 1802 are definitions used to formulate measures such as the PCI 204, as may be composed from the Deduct Curves from the DeductCurve object 1803 and descriptions of calculation algorithms described in published documents and standards. Deduct Values (computed from the Deduct Curve object 1803 and distress type, severity and density) produce a quantitative estimate of overall condition that have been established through research and discussion with infrastructure experts. For example, a Deduct Value of zero indicates the distress has no impact on structural integrity, or operational condition while a Deduct Value of 100 indicates an extremely serious fault impacting structural integrity. These "standardized" values are applied to specific structure types for which Deduct Curves have been established and used in determining a condition value (index), such as a PCI 204 for pavement sections. Thus, select embodiments of the present invention facilitate calculation of multiple distress-based measures available from the DistressBasedMeasure object 1801 and composed from the distress types in the DistressType object 1802. Select embodiments of the present invention treat the calculation of a condition measure, such as the PCI 204 for pavements, as a special case of calculating (implementing) within the DistressBasedMeasure object 1801 which in turn "realizes" the IConditionMeasure interface 1703. The calculation of a measure for a particular structural element, such as a pavement section, is made by applying the Deduct Curves for the measure to the particular distress types (and their severities and quantities) present.

In select embodiments of the present invention, the DistressType object 1802 has either three or one DeductCurve objects 1803 associated with it. The DistressType object 1802 has three curves, i.e., DeductCurve objects 1803, if the distress type has associated severity levels, i.e., low, medium, or high. In select embodiments of the present invention, an algorithm to calculate a DistressBasedMeasure 1801 is executed by a Calculate method (not shown separately). The Calculate method iterates through the inspection samples and recorded distresses from a specific inspection. For each distress it accesses in the corresponding DistressType object 1802 it requests calculation of a Deduct Value. The DistressType object 1802, in turn, queries the appropriate DeductCurve object 1803 for the Deduct Value. Once the DistressBasedMeasure object 1801 has a Deduct Value for each distress, and employing the prior art PCI algorithm from ASTM Standards, the DistressBasedMeasure object 1801 then determines the overall Deduct Value for each pavement inspection sample, and rolls that into a resultant Deduct Value and calculates the PCI 204 for a specific structural element, such as a pavement section, the most basic pavement inventory item managed using select embodiments of the present invention.

Select embodiments of the present invention provide various properties for the Deduct curves in the DeductCurve object 1803 and under different distress-based measures in the DistressBasedMeasure object 1801. Each DistressBasedMeasure object 1801 "owns" a unique collection of distress types composed from the DistressType object 1802, in turn containing Deduct curves available at the DeductCurve object 1803. Because each Deduct curve at the DeductCurve object 1803 has properties that allow a curve to be scaled or shifted, various distress-based measures from the DistressBasedMeasure object 1801 may use adjusted Deduct curves as provided by the DeductCurve object 1803 for the same distresses. In principle, a new condition measure (e.g., a PCI, SCI or FOD) realized at the IConditionMeasure interface 1703 could define a completely different Deduct curve at the DeductCurve object 1803 for some distresses.

Figure 19:
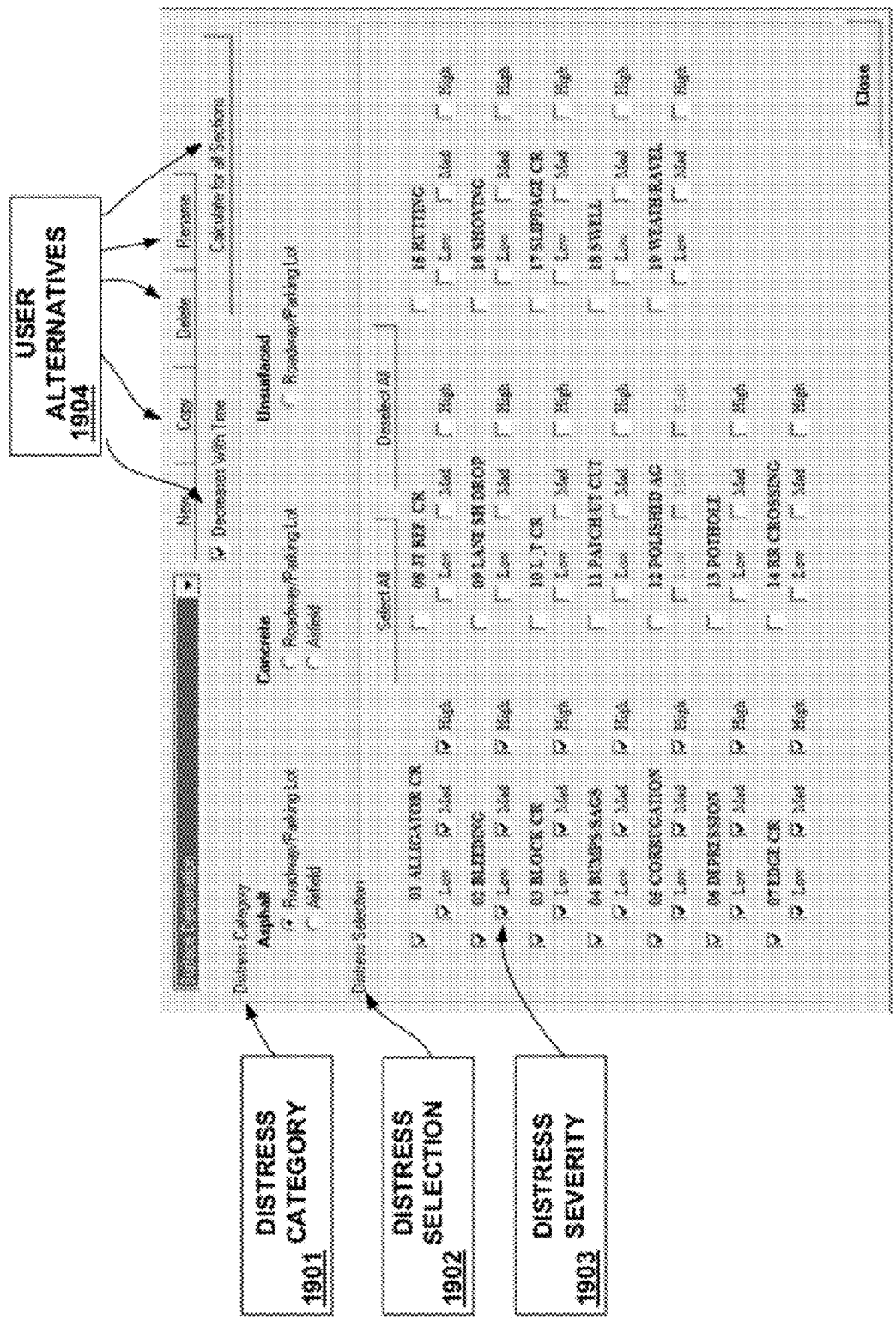
FIG. 19 depicts a screen used in select embodiments of the present invention that enables a user to select any combination of distresses and associated severities for specific types of pavement.

Refer to FIG. 19, a screen used in select embodiments of the present invention for M&R management of pavements. A user may select any combination of distresses 1902 and associated severities 1903 for specific types (Distress Category) 1901 of pavement. The menu of distresses 1902 and severities 1903 provided on screens such as represented by FIG. 19, as manipulated via user alternatives 1904, may be developed from stress conditions of those types 1901 and severities 1903 that are recorded on specific pavement inspection samples (not shown separately) by inspectors. In select embodiments of the present invention, this screen allows users to include user-selected distresses and severities in a custom user-defined condition index.

In select embodiments of the present invention, the screen represented in FIG. 19 may use the design described by FIG. 18 to create data in a User-Defined Distress Measure (condition index) object 1806 and a corresponding Distress Type in the DistressType object 1802 and Deduct Curve in the DeductCurve object 1803, all via user input. That is, a user may select individual distresses and severities and ignore others in the menu. In select embodiments of the present invention, this corresponds to setting the multiplier property of the DeductCurve object 1803 to 0 or 1. Other options include user-defined multipliers.

For some specific purposes, a particular distress may be more important (i.e., have a larger Deduct Value) than it does for other purposes. One example is the Foreign Object Damage (FOD) measure 1805, developed by the Construction Engineering Research Lab (CERL) of the Engineer Research and Development Center of the U.S. Army Corps of Engineers and the US Air Force. The FOD index 1805 measures how likely the pavement is to produce material that could damage a jet engine. One of the distresses used by the PCI calculation method for concrete pavements is called Joint Seal Damage (not shown separately). Joint Seal Damage occurs when sealant between concrete slabs breaks down. The Deduct Value for Joint Seal Damage for a PCI 204 is based on a damaged joint indicating that water can enter and erode the foundation, and incompressible material can get lodged in the joint, causing cracking or other damage. However, for a FOD measure 1805, Joint Seal Damage has a much higher Deduct Value because when the seal is damaged the availability of loose material produces a higher likelihood of aircraft engine damage.

In select embodiments of the present invention, the ability to define "custom" distress indices is enhanced by the presence of CopyFrom buttons (under User Alternatives 1904) used to copy from a completed screen such as that of FIG. 19. This allows users, such as pavement managers, to start with a comprehensive standardized definition of a PCI 204 and tailor it to specific needs. Select embodiments of the present invention permit users to define new standard distress indices. This approach was used in formulating two new standard pavement condition indices used by the US Air Force, SCI (Structural Condition Index) 1804 and FOD (Foreign Object Damage) 1805.

M&R Planning and Project Formulation

Refer to FIGS. 1 and 6. FIG. 6 is a flow chart describing the process steps and outputs for the Project Formulation process 106 as may be implemented in select embodiments of the present invention. In select embodiments of the present invention, individual projects are defined 601 prior to executing 602 a Work Plan that includes both planning for the work and budgeting of the work. The Work Plan, or M&R Plan, is a tool for planning, scheduling, budgeting, and analyzing alternative M&R activities. The Work Plan uses basic inventory data combined with inspection information, maintenance policies, maintenance costs, predictions of future pavement condition, and the like. All factors used in determining an appropriate M&R alternative may be configured by a user to reflect local management practices.

Select embodiments of the present invention facilitate determining consequences of alternative budgets on a structure's condition maintenance as well as on M&R programs and projects that remain unfunded. Further, the Work Plan may be used to determine the budget needed to meet specific M&R scenarios describing a particular planning objective or purpose. This enables M&R managers to develop a variety of funding alternatives to support decision making.

In select embodiments of the present invention, once new projects have been formulated 604, a budget consequence analysis is re-executed 602, 603 and the resulting annual budget variations analyzed 603 in terms of annual deficit and surplus. The new output from the execution 602 of the Work Plan is then analyzed 603 prior to the formulation 604 of new projects. The process is iterated as necessary as continued interactive formulation of projects 605 until acceptance and finalization of the new projects in a plan 606. From the plan 606, a project list 107 (FIG. 1) is made and fed back 109 in the IMM as input to Inventory & Work History 101.

Figure 12:
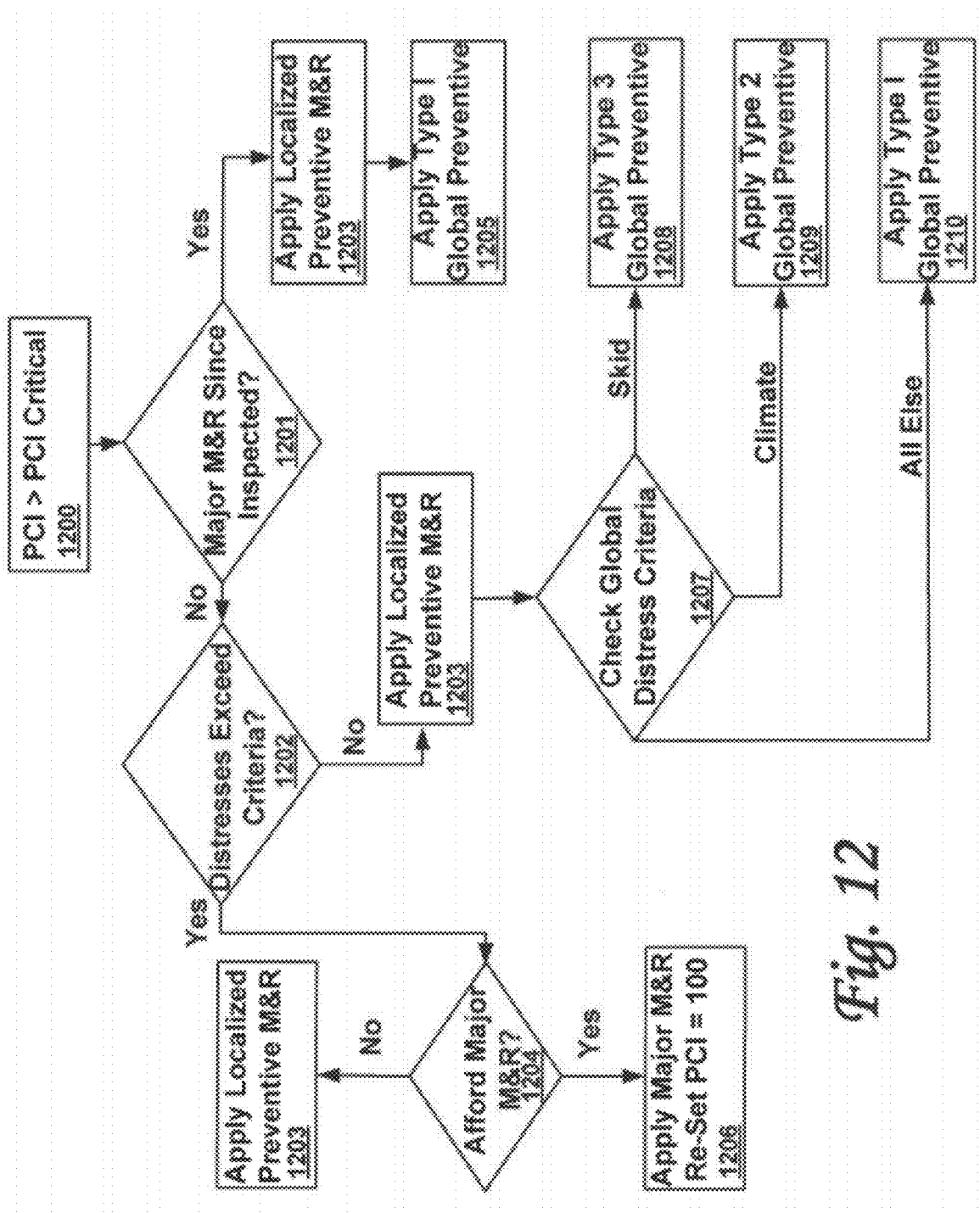
FIG. 12 is a block diagram describing an algorithm that may be used in select embodiments of the present invention for determining the type of M&R to be applied in those cases where the PCI>PCI Critical.

In select embodiments of the present invention, the work planning and budgeting algorithm, i.e., the Critical PCI Method, is revised to operate with, and to be subservient to, projects that a user has input to the system. This is accomplished using a concept of minimum work intervals and a modified budgeting process as explained in discussions about FIG. 24 below. In conventional engineered management systems, the existing algorithm for managing global work is such that once a specific Global Preventive M&R type is selected (e.g., as described by FIG. 10), that Global Preventive M&R type is repeated for the same structural element, such as a pavement section, at the interval specified by local policy. In select embodiments of the present invention, this is modified so that only a Type 1 Global Preventive M&R event is applied after the structural element receives Major M&R. Incorporation of this modification is shown in FIG. 12 as explained below.

Refer to FIG. 8, a flowchart used with select embodiments of the present invention for determining the type of work needed for pavement sections with a PCI above the Critical PCI. The first step is to check for load-related distresses 801 of the pavement section. If the pavement is structurally deficient, then Major M&R should be applied. The existing PCI 204, as picked off the PCI vs. Unit Cost relationship curve 808 at the point 807 in the graph 804, is used to establish if there is any structural deficiency. Table 1 provides a list of distresses that have been used in a prior art Work Plan to identify pavement sections that are rated above the Critical PCI but are structurally deficient.

TABLE 1

Prior art list of structural distresses that may be used in a Work Plan to identify structurally deficient pavement sections.

| Pavement | Deficiency Type | Level | Coverage (%) |
|---|---|---|---|
| Asphalt | Alligator Cracking | L + M + H | >0.5 |
| | Patching | M + H | >10 |
| | Potholes | L + M + H | >0.1 |
| | Rutting | M + H | >10 |
| Concrete | Large Patching | M + H | >10 |
| | Corner Break | L + M + H | >5 |
| | +Divided (Shattered Slab) | L + M + H | |
| | +Punchout | M + H | |

Conventionally, the cost of Major M&R is estimated based on the curve 808, i.e., the lower the PCI the greater the unit cost, thus one would prefer to perform M&R when the PCI 204 is reasonable as shown at the point 807. The unit cost at the current PCI 204 of the pavement section is multiplied by the area of the pavement section to determine the cost. If the pavement section is structurally deficient, the next step is to check on funds availability 805 based on current (available) budget and Major M&R priorities. If funds are available, Major M&R is applied 806 and the PCI value is re-set to 100. If funds are not available, Localized Preventive M&R is applied 802 for the current planning year, and funds availability is checked in the following planning years. Of course, if the pavement structure is not structurally deficient, Localized Preventive M&R or Global Preventive M&R is applied 802, 803 in accordance with local maintenance policy. Estimates of the cost of Localized Preventive M&R are based on the PCI vs. Unit Cost relationship curve 808. The unit cost of M&R at the current PCI 204 of the pavement section is multiplied by the area of the pavement section to estimate cost of Localized Preventive M&R for that pavement section.

Refer to FIG. 12, a block diagram describing an algorithm that may be used in select embodiments of the present invention for determining a Global Preventive M&R type to be applied in those cases where the pavement condition is such that the PCI is greater than PCI Critical 1200. In this version, the first question asked is if a Major M&R has been conducted 1201 on the pavement section since its last inspection. If yes, recommended action is to apply Localized Preventive M&R 1203 and follow-up at the appropriate time with a Type 1 Global Preventive M&R 1205. If no, then the distresses are evaluated to determine if they exceed 1202 pre-specified criteria. If no, then apply Localized Preventive M&R 1203 and check the Global Distress Criteria 1207. If needed for upgrading performance, e.g., controlling "skid," apply a Type 3 Global Preventive M&R 1208. If needed for addressing deficiencies presented by climate changes apply a Type 2 Global Preventive M&R 1209. If other lesser criteria are relevant, apply a Type 1 Global Preventive M&R 1210. If yes, ask if a Major M&R can be funded in the budget 1204. If no, apply Localized Preventive M&R 1203. If yes, apply Major M&R and re-set the PCI to 100 1206.

Conventional Work Planning tools support "network-level" analysis. A network level analysis identifies only the category of work needed (e.g., local, surface treatments, major repair) and the specific pavement sections and years needing M&R. Further, network-level analysis also provides only an approximate cost for work based on Cost-by-Condition curves (not shown separately). Project-level analysis, in contrast, identifies specific types of work and associated costs in sufficient detail to support development of contract documents. Select embodiments of the present invention include project-level planning tools.

Inventory History

In select embodiments of the present invention, pavement M&R management includes collecting data for calculating variation in a PCI 204 over time. Such data normally include multiple inspection results for a single pavement section. If properties of pavement sections never changed, inspection data such as inspection date, sample data, surface category, size and the like could be stored separately from inventory and a user could just refer to properties when needed. However, pavement section properties do change. For example, definitions of pavement sections are sometimes changed. Therefore, as provided in select embodiments of the present invention, it is necessary to store the properties existing at the time of inspection with inspection data. Thus, if there is a change in those parameters identifying a pavement section, e.g., it is enlarged or resurfaced, original data from which the PCI was calculated are available.

Conventionally, this requirement is implemented by adding fields to the database table where inspections are stored. Previously, when an inspection was created, the software stored the added fields (e.g., surface category, use type, area, slab size, number of slabs, and the like) in the inspection record. This simple method worked, but had two shortcomings. First, only the data necessary for PCI calculation is stored, thus, if at some future time a user wished to relate the PCI 204 to some other property of inventory, that data were not available. Second, it is inefficient since properties of pavement sections change slowly, thus multiple inspection records often contain the same set of cached values, unnecessarily increasing the size of the database.

Select embodiments of the present invention employ a more efficient approach. For example, for pavements, inventory data are divided among pavement networks, pavement branches and pavement sections. Select embodiments of the present invention have separate database tables for each of these three categories (levels) and inventory properties are entered once and shared among these tables. For example, the pavement Branch table may store use (e.g.; roadway, airfield, parking lot, and the like) while surface type (e.g., concrete, asphalt) may be stored in the pavement Section table. That is, duplication of records is avoided.

Refer to FIG. 13 showing a general structure employed by select embodiments of the present invention. The odd-numbered boxes 1301, 1303, 1305, 1307 and arrows between them on the left are those that conventional engineered management systems may use. The even numbered boxes 1302, 1304, 1306 on the right and arrows to, from and between them, represent the structure and relationships added for use in select embodiments of the present invention to store, manipulate, and access historical properties of inventory. The Network 1302, Branch 1304 and Section 1306 History tables have the same set of properties as their respective Network 1301, Branch 1303, and Section 1305 tables. When an inspection 1307 is created, it is pointed at an appropriate record in the Section History table 1306. Since all inventory properties are stored in the History tables 1302, 1304, 1306, it is possible to efficiently address any future need for relationships between inspections and inventory properties.

Figure 14:
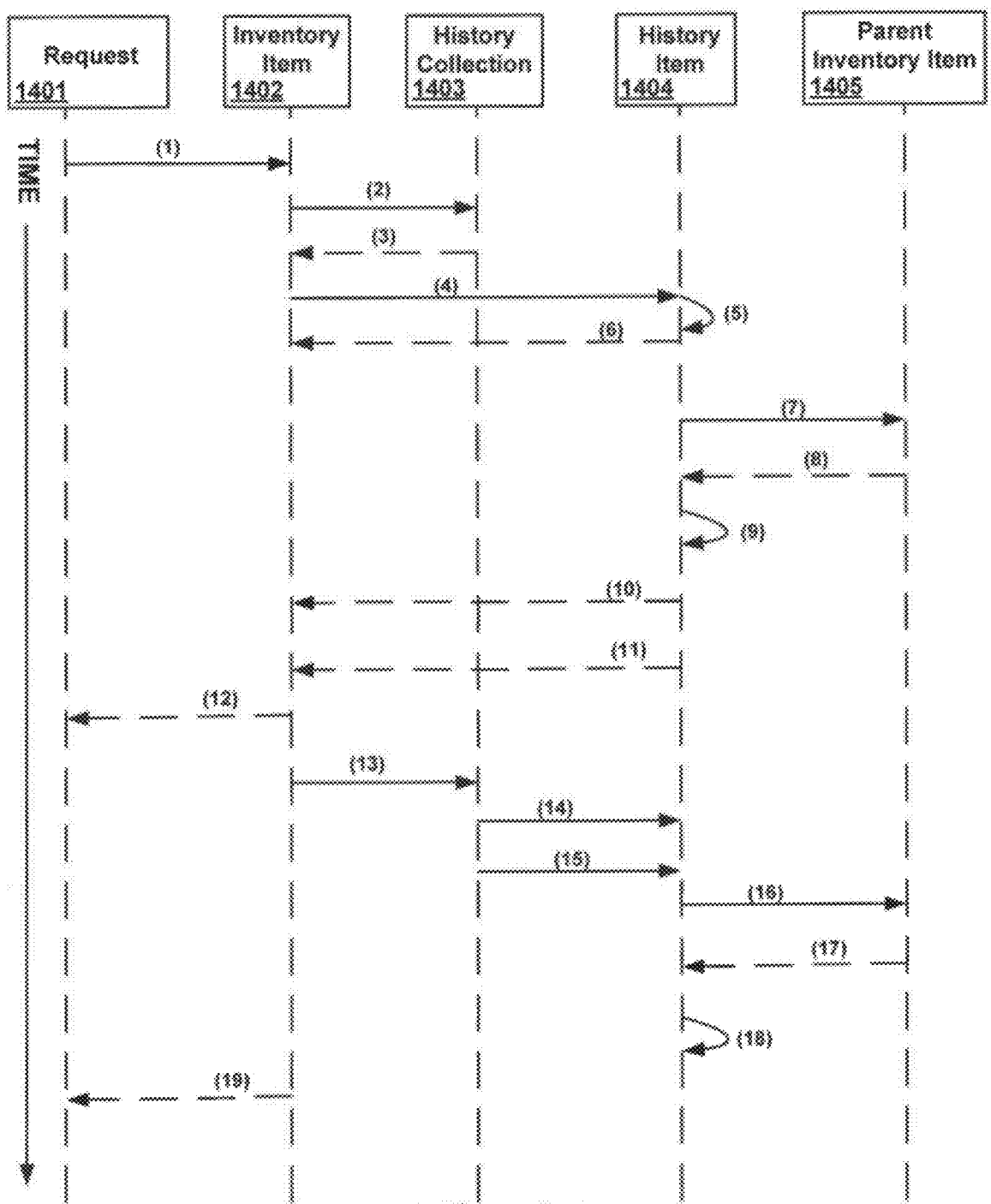
FIG. 14 is a Unified Modeling Language (UML) sequence diagram of a "history creation" algorithm for efficient creation of inventory history records as employed in select embodiments of the present invention.

Refer to FIG. 14, a UML sequence diagram of a history creation algorithm for efficient creation of the inventory history records of FIG. 13 as employed in select embodiments of the present invention. Conventionally, the data used to populate the structure and create the relationships shown in FIG. 13 in the left boxes 1301, 1303, 1305, 1307 (a simple method) would be entered every time a new inspection is created, resulting in inefficiency. Instead, select embodiments of the present invention adopt a lazy creation approach. The boxes 1401-1405 at the top of FIG. 14 are objects. The dashed lines (3), (6), (8), (10), (11), (12), (17), (19) below the objects 1401-1405 are their life lines displaying the relative lifetime (duration) of the existence of each object in memory. Time starts at the top and actions are time sequenced in order to the bottom of FIG. 14. The solid arrows (1), (2), (4), (5), (7), (9), (13), (14), (15), (16), (18) represent procedure calls (or messages) between the boxes (objects) 1401, 1402, 1403, 1404, 1405. To understand the history creation algorithm used in select embodiments of the present invention, note that the three levels of inventory (network, branch, and section) are the same with respect to inventory history. Each inventory item has a collection of history items associated with it, regardless of whether that item is a network, a branch, or a section. Thus, a recursive approach may be used to both create and obtain history records. Further, realize that the consumer of the history record does not need to know if a new record is being created. An external user simply asks for the current history item (and may refer to it as such) without requiring the knowledge of when it was actually created.

Referring again to FIG. 14, the algorithm may be employed as follows. In select embodiments of the present invention, in step (or procedure call) (1), a Request object 1401 asks for the current history item for an Inventory Item object 1402. The Inventory Item object 1402, in turn, requests (2) and retrieves (3) the latest (by date) history record from its History Collection object 1403. These steps implicitly require that each history record be time-stamped. The latest History Item object 1404 is then asked (4) if the existing records match the current inventory properties. If the properties of the History Item object 1404 do not match, this information is fed back (5), a new History Item object 1404 is created (6), setting its properties to the current inventory properties. Its parent is requested (7) and retrieved (8) from the Parent Inventory Item object 1405. The retrieval (8) of the parent employs the same algorithm recursively.

If the current History Item object 1404 does match the properties of the current Inventory Item object 1402, the algorithm checks (9) if the parent of the History Item object 1404 has changed. The algorithm asks recursively for the current History Item object 1404 of the parent, then compares (10) the identifier of the parent to its own parent identifier to see if the identifier has changed. If the identifier of the parent matches (11), i.e., nothing has changed, the existing history record may be used (12) by the Request object 1401. If the identifier of the parent is different, a new history record is created (13) in the History Collection object 1403. The History Collection 1403 tells (14) the new History Item 1404 to copy its properties from Inventory Item 1402 then tells the History Item object 1404 to set its parent (15). Next, the History Item object 1404 requests (16) and retrieves (17) the current history item from the Parent Inventory Item object 1405. It establishes the current history item from the Parent Inventory Item 1405 in the History Item object 1404 by attaching (18) the current history item thereto. Finally, the new history term is returned (19) from the Inventory Item object 1402 to the Request object 1401.

Figure 15:
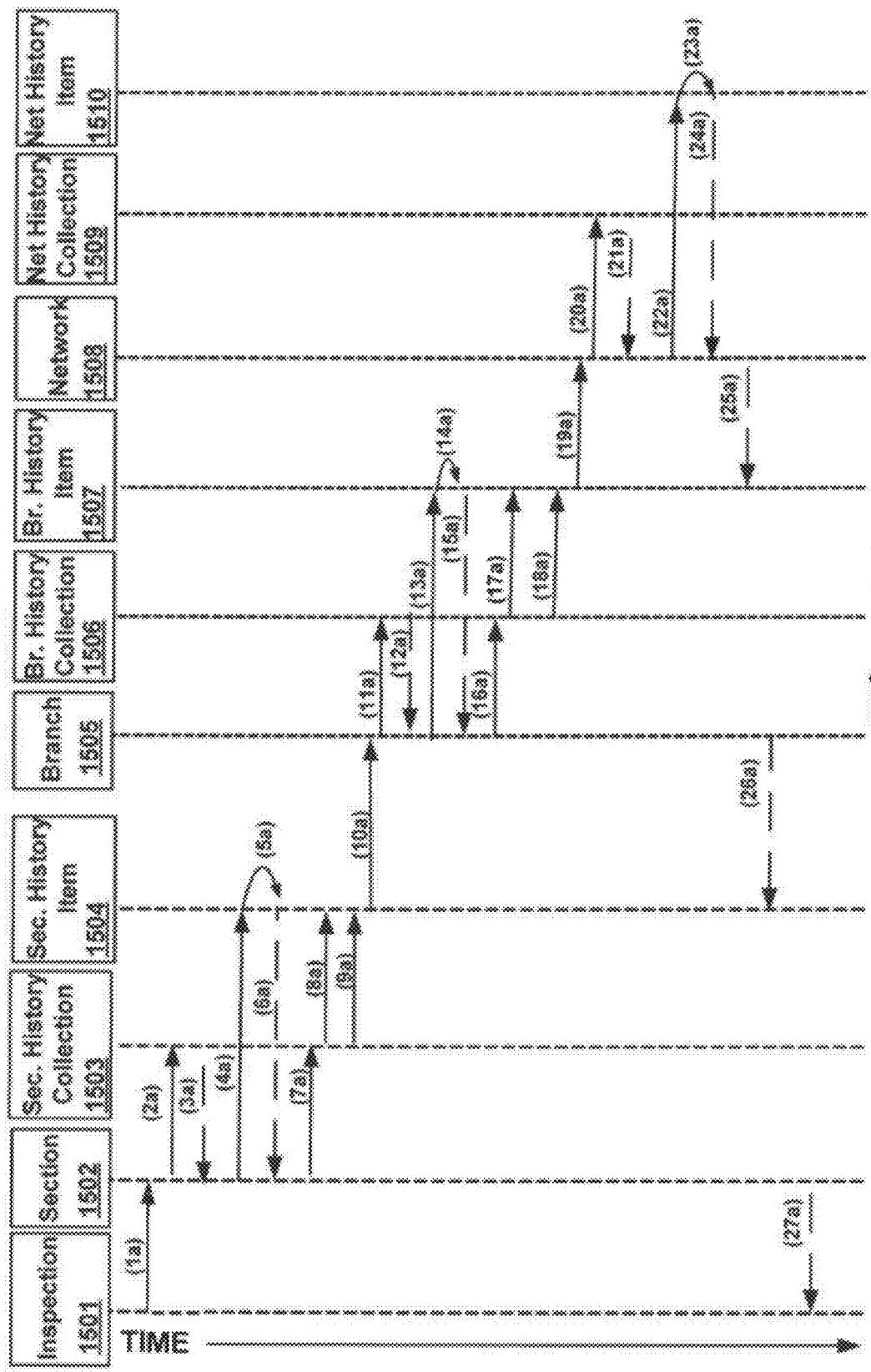
FIG. 15 depicts the way an algorithm is employed across three layers of an inventory structure as used in select embodiments of the present invention.

Refer to FIG. 15, for the way an algorithm is employed across three layers of an inventory structure as may be used in select embodiments of the present invention. In this example, assume section and branch properties have changed since any updating of history records, but no network properties have changed.

In select embodiments of the present invention, a sequence begins, for example, when a newly created Inspection object 1501 queries (1a) the corresponding Section object 1502 for a current history record. The Section object 1502 queries (2a) the corresponding Section History Collection object 1503 for the latest history record which is delivered (3a) to the Section object 1502. The Section object 1502 then queries (4a) the corresponding Section History Item object 1504 if the current history records suffice. The Section History Item object 1504 determines (5a) that some property of the identified pavement section has changed, and returns (6a) a No to the pavement Section object 1502. The pavement Section object 1502 then queries (7a) the corresponding Section History Collection object 1503 to create a new history item and to copy (8a) the current pavement section properties into the Section History Item object 1504, then, to attach (9a) the parent of the pavement section prior to delivery to the Section History Item object 1504. The request for the current history is directed (10a) from the Section History Item object 1504 to the corresponding Branch object 1505 of the pavement section as a recursive call within the algorithm of FIG. 14. The Branch object 1505 repeats the process of asking for the latest history from the Branch History Collection object 1506, querying (11a) the Branch History Item object 1506 to return (12a) the latest history to the Branch object 1505. The Branch object 1505 then queries (13a) the Branch History Item object 1507 if the current records suffice. As with the Section object 1502, the latest Branch History Item object 1507 determines (14a) if the properties match and, for example, that some property has changed, and returns (15a) an answer No to the Branch object 1505. As a result, the Branch object 1505 asks (16a) the corresponding Branch History Collection object 1506 to create (17a) a new history record to copy properties to the Branch History Item object 1507 and to attach (18a) the corresponding parent to the record in the corresponding Branch History Item object 1507. The Attach Parent request (18a) results in a third recursive call (19a), this time to the corresponding Network object 1508. The Network object 1508 requests (20a) a latest history record from the Network History Collection object 1509 which delivers (21a) the latest history to the Network object 1508. The Network object 1508 asks (22a) the Network History Item object 1510 if the current records suffice. As an example, in this case the Network History Item object 1510 checked (23a) for matching properties and the records did match and, since there is nothing above the Network object 1510, the recursion ends with the positive check being delivered (24a) to the Network object 1508. The existing record is returned (24a) from the Network History Item object 1510 via the Network object 1508 and attached (25a) to the new Branch History Item object 1507 record, the return (25a) ending the second level of recursion. Finally, the record for updating the Section History Item object 1504 is obtained (26a) from the new Branch object 1505 record and fed back (27a) from the pavement Section object 1502 to the Inspection object 1501 where the procedure began.

Thus, in select embodiments of the present invention this algorithm addresses the second shortfall of the prior art simple method by guaranteeing that new history records are created only when some inventory property has changed. Note that the algorithm also insures, via recursive calls, that if a higher level of the inventory hierarchy changes, a new record will be created at the lower level.

The WebPAVER™ and MicroPAVER™ programs used in select embodiments of the present invention use an accurate estimate of the Last Construction Date (LCD) for each pavement section to predict performance, maintenance requirements, costs, schedules and the like; for establishing schedules, descriptive definitions, and guidance for the Inspection methodology 102. For example, WebPAVER™ and MicroPAVER™ update the LCD for each pavement section to the most recent major M&R event. In select embodiments of the present invention, an electronic Work History form is the interface for users to enter work history data for each pavement section. For use in select embodiments of the present invention, a method for estimating an unknown LCD is presented below.

Figure 16:
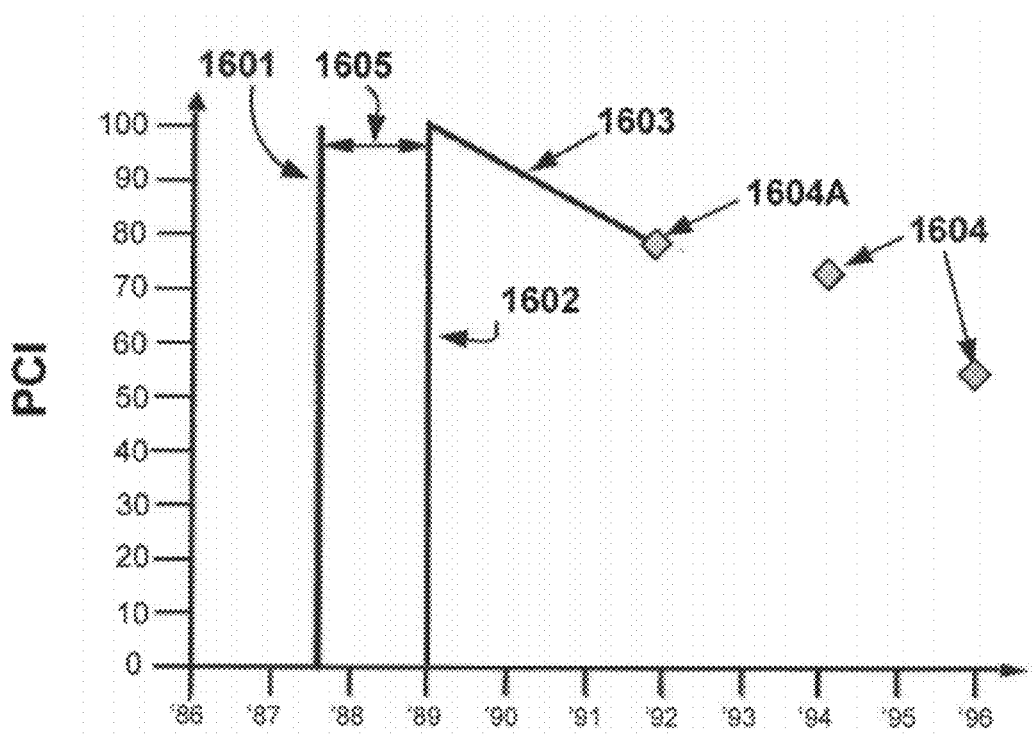
FIG. 16 is a graphical representation of a solution used with select embodiments of the present invention to predict Last Construction Date (LCD).

Refer to FIG. 16, depicting graphically a solution for an LCD-Back Calculation (interpolation) as used with select embodiments of the present invention to predict Last Construction Date (LCD) such as for pavement, i.e., the last date where the PCI 204 was or should have been set to 100. In this example, the solution employs data representing the PCI 204 plotted against age in years relative to the actual inspections 1604 that quantify the PCI 204. For pavement sections where the LCD is unknown, the LCD is back-calculated assuming either a typical linear deterioration rate or an assigned Family Curve. The interpolation starts from the first inspection 1604A of the inspections 1604 following an uncertain LCD. Assuming a linear relationship between the first inspection 1604A and the last year in which the PCI 204 was 100 and establishing the slope of deterioration 1603 from more recent inspections 1604, the last year 1602 at which the PCI 204 was 100 can be estimated. Alternately, knowing the Family Curve for the pavement type, one can interpolate the period of time 1605 that the pavement remained at a PCI 204 of 100 and back-calculate the LCD. In the case shown in FIG. 16, the LCD is shown at 1601 to be mid-'87. In select embodiments of the present invention, if the interpolated LCD is older than a possible but uncertain (probable) LCD, or more recent than the uncertain LCD and within a user-specified tolerance for uncertainty, the back-calculated LCD may be disregarded.

Condition Prediction Modeling

In select embodiments of the present invention, prior art Condition Prediction Modeling is included in the Infrastructure Management Methodology (IMM) (FIG. 1), such as may be used for managing M&R of pavements. Chapter 7, Shahin (2005). Select embodiments of the present invention employ a variety of algorithms for Condition Prediction Modeling as applied to a particular condition index, e.g., the PCI 204, the FOD 1804, SCI 1805, and the like. In select embodiments of the present invention, the same user interface screen may be used to create and display models for various Family Types as well as various condition prediction modeling algorithms.

Figure 20:
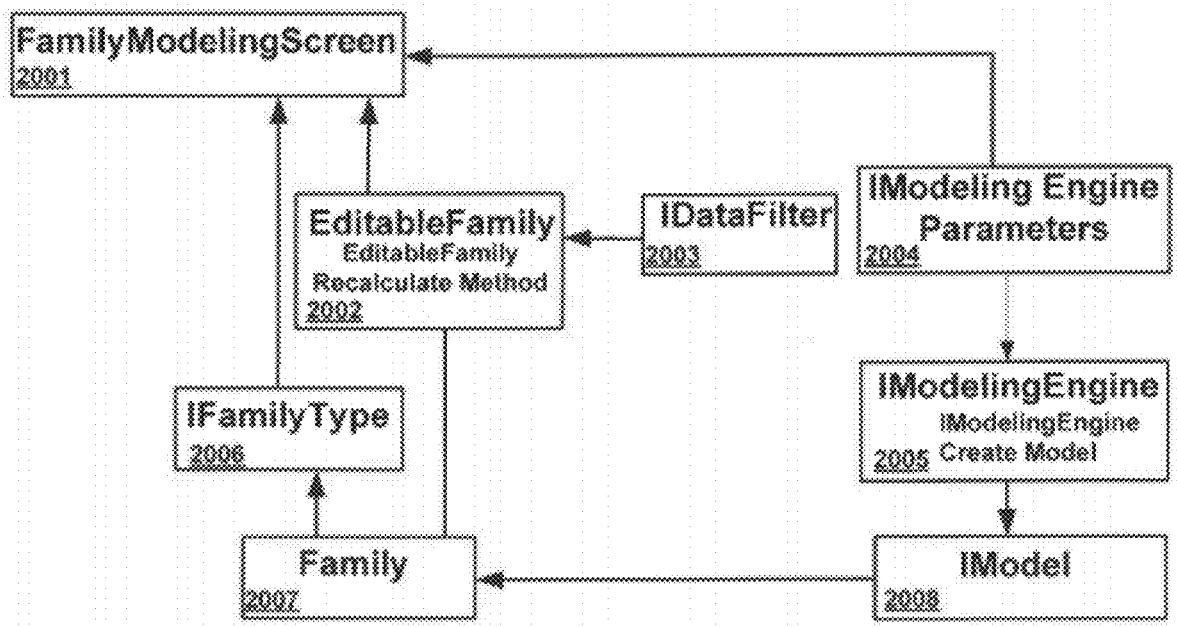
FIG. 20 is a UML class diagram permitting select embodiments of the present invention to support multiple condition prediction engines and multiple family types with a single user interface screen, extending the model of FIG. 17.

Refer to FIG. 20, a UML class diagram describing how select embodiments of the present invention may support multiple condition prediction engines and multiple Family Types with a single user interface screen, the FamilyModelingScreen 2001. Note that in select embodiments of the present invention, the model represented in FIG. 20 extends that of the model represented in FIG. 17, particularly with respect to the concept of Family Type. The model of FIG. 20 supports the notion of a family of manmade structures, such as pavements, that behave similarly with respect to condition. Nunez, M. N. and M. Y. Shahin, Pavement Condition Data Analysis and Modeling, Transportation Research Board, 1986. Shahin, M. Y. and J. A. Walther, Pavement Maintenance Management for Roads and Streets Using the PAVER™ System, Technical Report No. M90/05, U.S. Army Construction Engineering Research Laboratory, 1990.

In select embodiments of the present invention, each family has an associated model implementing the IModel interface 2008, in turn associated with an object implemented in the IModelingEngine interface 2005. If the modeling engine has parameters that a user establishes, IModel interface 2008 is constructed using an IModelingEngineParameters interface 2004 that allows a user to edit parameters by aggregation of the parameters at the FamilyModelingScreen object 2001. The FamilyModelingScreen object 2001 is independent of the modeling engine used or of the kind of model produced. The EditableFamily class 2002 is derived from the Family class 2007 and adds a collection of IDataFilter objects 2003. The IDataFilter objects 2003 are used to filter the data used by the IModelingEngine 2005 to build the IModel 2008. In select embodiments of the present invention, the FamilyModelingScreen object 2001 and associated classes operate as follows.

In select embodiments of the present invention, a user may select the Family Type by employing the IFamilyType interface 2006 to build prediction models. A Family Type (available at the IFamilyType interface 1705) references (i.e., is aggregated from) two measures, one for the abscissa (IConditionMeasure interface 1703) of the model and one for the ordinate (IMeasure interface 1701). In select embodiments of the present invention, it is common that the abscissa is time (e.g., Age) and the ordinate is the value of a condition measure (e.g., PCI). Many alternatives such as other condition measures (e.g., SCI) and other abscissa measures (e.g., Traffic) are possible.

In select embodiments of the present invention, when a user selects a Family Type at the IFamily Type interface 2006, the collection of families (stored in the Family object 2007) of that type becomes available. In select embodiments of the present invention, a user may choose to create a new family or edit an existing family using the EditableFamily object 2002. When a particular family is chosen, it is graphed similar to FIG. 7 on the EditableFamily object 2002.

In select embodiments of the present invention, a user may select data points to be used to build or rebuild a model using the radio button Select Method (not shown separately) on the EditableFamily object 2002. Structures that support building family models may be formulated without knowing beforehand which Family Type (condition measure/measure pair) or even which modeling technique is being used. The user is able to select data points used to build a model, however, the particular means to select data points is unimportant. For example, in PAVER™, the means is a screen termed the EMS Query Tool. In select embodiments of the present invention, a user may modify the data filters (using the IDataFilter interface 2003) associated with a new or existing family from the Family object 2007. Data filters, as the name suggests, filter out inappropriate or undesirable items, e.g., outliers, from available data.

Select embodiments of the present invention support implementation of the IModelingEngine interface 2005 that employs a constrained least squares algorithm for the production of polynomials. In select embodiments of the present invention, the IModelingEngine interface 2005 is realized via a parameter screen (not shown separately but implementing the IModelingEngineParameters interface 2004) that allows a user to adjust constraints and the order of the polynomial. In select embodiments of the present invention, other modeling engines may be used to realize the modeling interfaces 2004, 2005 and 2008.

Figure 21:
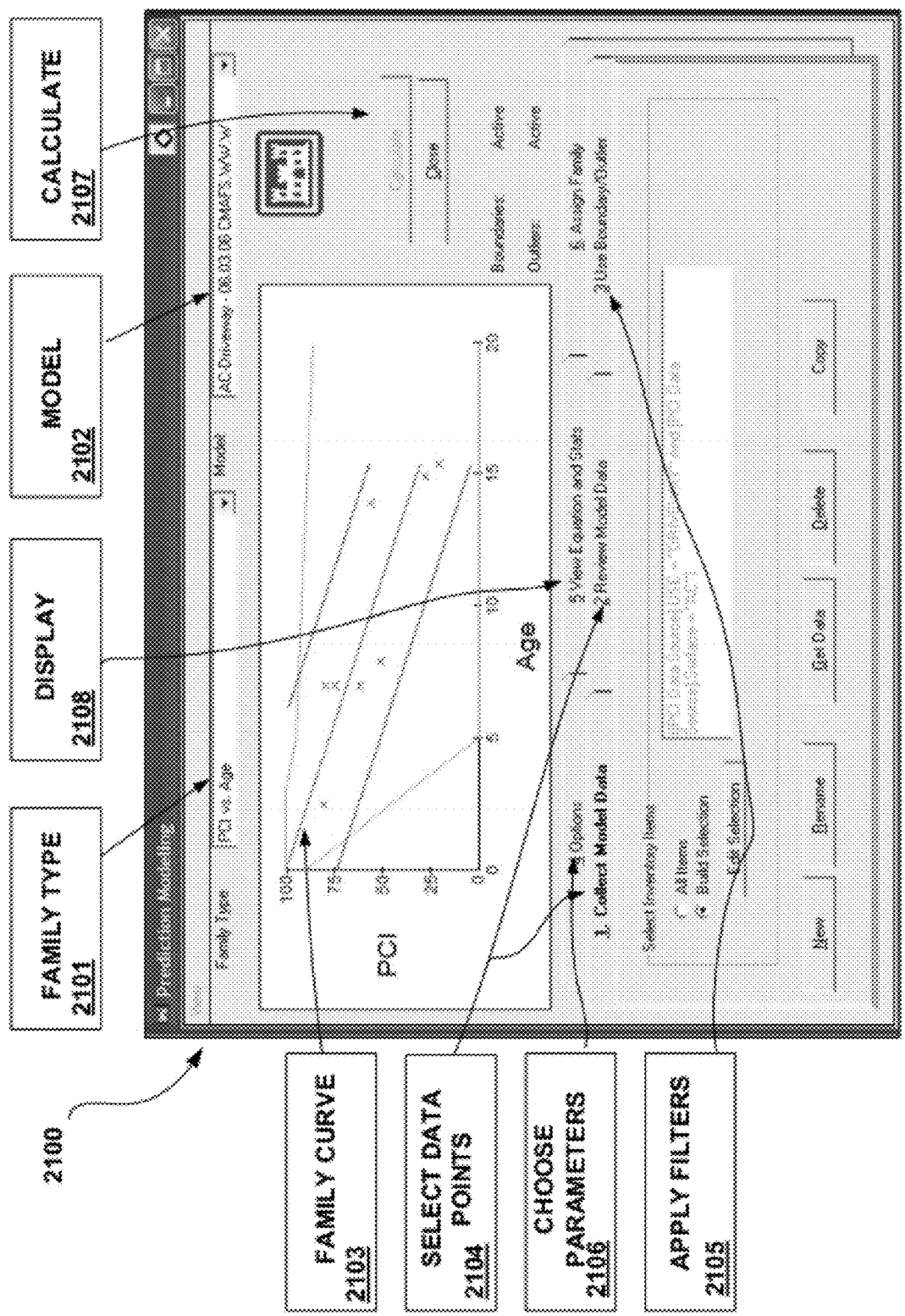
FIG. 21 depicts a family modeling screen as may be selected by a user implementing select embodiments of the present invention.

In select embodiments of the present invention, when the data, filters and engine parameters are available for processing, an EditableFamilyRecalculate method is enabled at the EditableFamily interface 2002. Once initiated this method calls a selected "IModelingEngineCreate Model" at the IModelingEngine interface 2005 that creates a new instance implementing the IModel interface 2008. This instance is attached (composed) to the current family at the Family object 2007. Refer to FIG. 21, a screen print that may be used in select embodiments of the present invention. In select embodiments of the present invention, a user may view a description of the resulting custom model by pressing the radio button View Equation and Stats at the Display tab 2108 of the Family Modeling Screen 2100.

Work Planning

Figure 22:
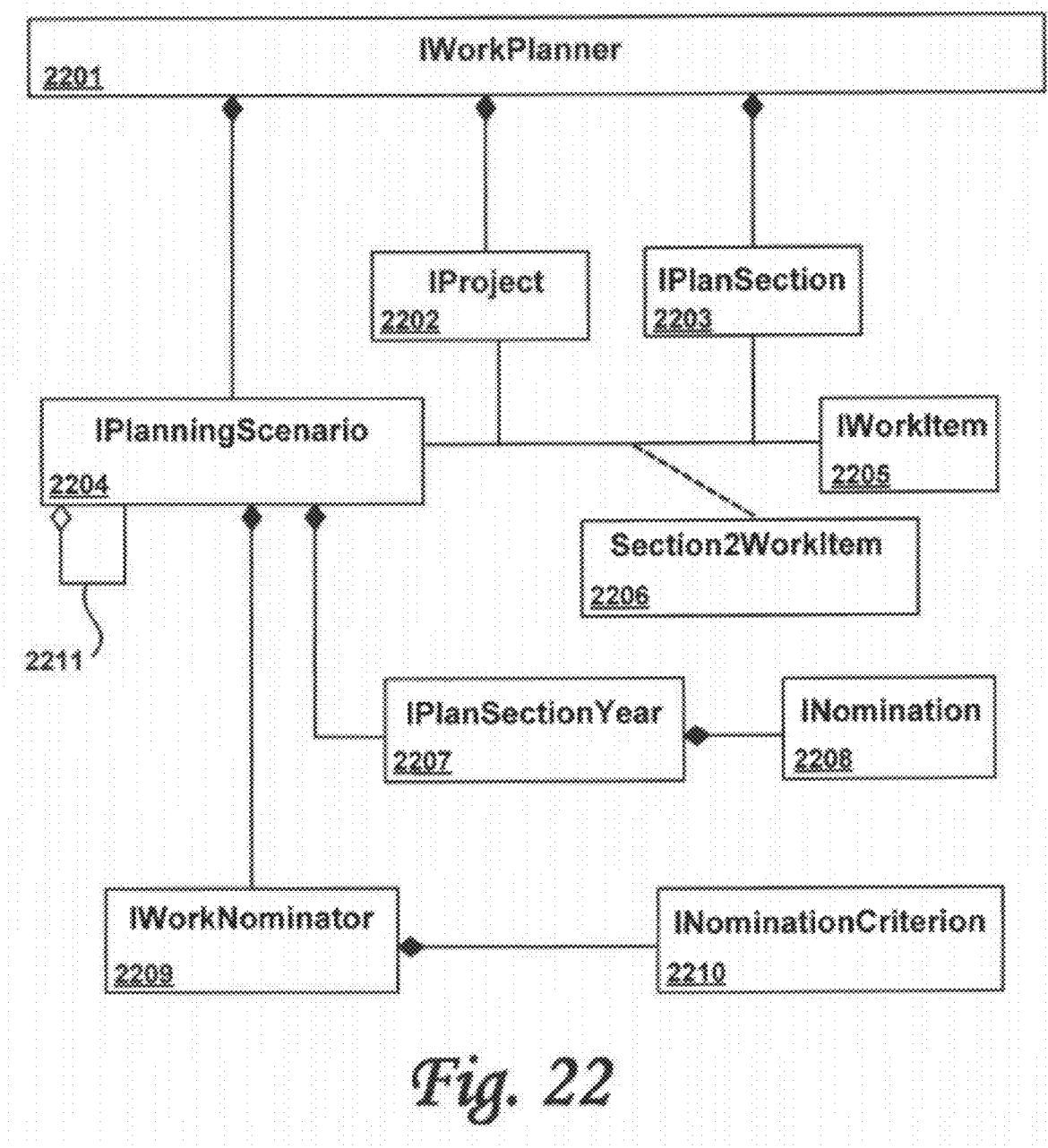
FIG. 22 is a UML class diagram of the general structure of the Work Planner used in select embodiments of the present invention.

Refer to FIG. 22, a UML class diagram of the general structure of the Work Planner, a complex subsystem used in select embodiments of the present invention. Work planning identifies the category, type and timing of Required Work. Select embodiments of the present invention support various planning scenarios by quantifying project details, budget, timing, and Delay Penalty for each.

In select embodiments of the present invention the structure of the Work Plan facilitates various capabilities. At the top-level, the IWorkPlanner interface 2201 is composed from (allows access to) scenarios made available via the IPlanningScenario interface 2204, projects made available via the IProject interface 2202 and information about basic structural elements, such as pavement sections, made available from the IPlanSection interface 2203. The three interfaces, IPlanningScenario interface 2204, the IProject interface 2202 and the IPlanSection interface 2203, are further related to the IWorkItem interface 2205 through the Section2WorkItem class 2206. Projects are defined by a user. In select embodiments of the present invention, data describing pre-specified basic structural elements, such as pavement sections, are stored in inventory databases and obtained therefrom when planning starts.

In select embodiments of the present invention, the basic element of planning is the scenario. A scenario has a particular planning objective or purpose. For example, select embodiments of the present invention employ a scenario termed No Work to represent the situation where no work is done at all regardless of inspection results or pavement condition. The No Work scenario is suited to condition assessments. Conversely, a scenario termed All Work represents a situation in which all work is done as soon as it is needed. In select embodiments of the present invention, a scenario may be initiated from a base scenario 2211 that provides a starting point aggregated to the IPlanningScenario interface 2204. For example, in select embodiments of the present invention, a Budget scenario has a scenario of All Work as its base. In select embodiments of the present invention, the Budget scenario is represented realistically as a limited budget, i.e., costs must be accounted for in planning to a targeted amount of available funding.

In select embodiments of the present invention, a scenario comprises a set of nominators provided via an IWorkNominator interface 2209 as well as plans for individual sections, such as pavement sections, provided via an IPlanSectionYear interface 2207 in addition to a possible base scenario 2211. A particular nominator describes a specific type of work on a structure, such as pavement work. For example, a Major Work nominator describes Major M&R that returns a pavement section to "good as new" (un-distressed) condition, i.e., the PCI 204 is set to equal 100. Each nominator has criteria aggregated and made available via the INominationCriterion interface 2210. In select embodiments of the present invention, criteria also establish the required (or relevant) timing of the work "nominated by" a nominator made available via the IWorkNominator interface 2209.

The nominators and associated criteria nominate work in an aggregation that is also associated with an annual plan made available via an INomination interface 2208 that is aggregated to an IPlanSectionYear interface. Each nomination belongs to a section year made available via the IPlanSectionYear interface 2207. The IPlanSectionYear interface 2207 aggregates to the IPlanningScenario interface 2204 all of the work being done on a particular section, such as a pavement section, in a particular year. This section year and nomination structure is used to track the basic planning state. The detailed planning state is captured in work items made available via the IWorkItem interface 2205, associated, as noted above, with projects made available via the IProject interface 2202 and with sections made available via the IPlanSection interface 2203, and with scenarios made available via the IPlanningScenario interface 2204.

Figure 23:
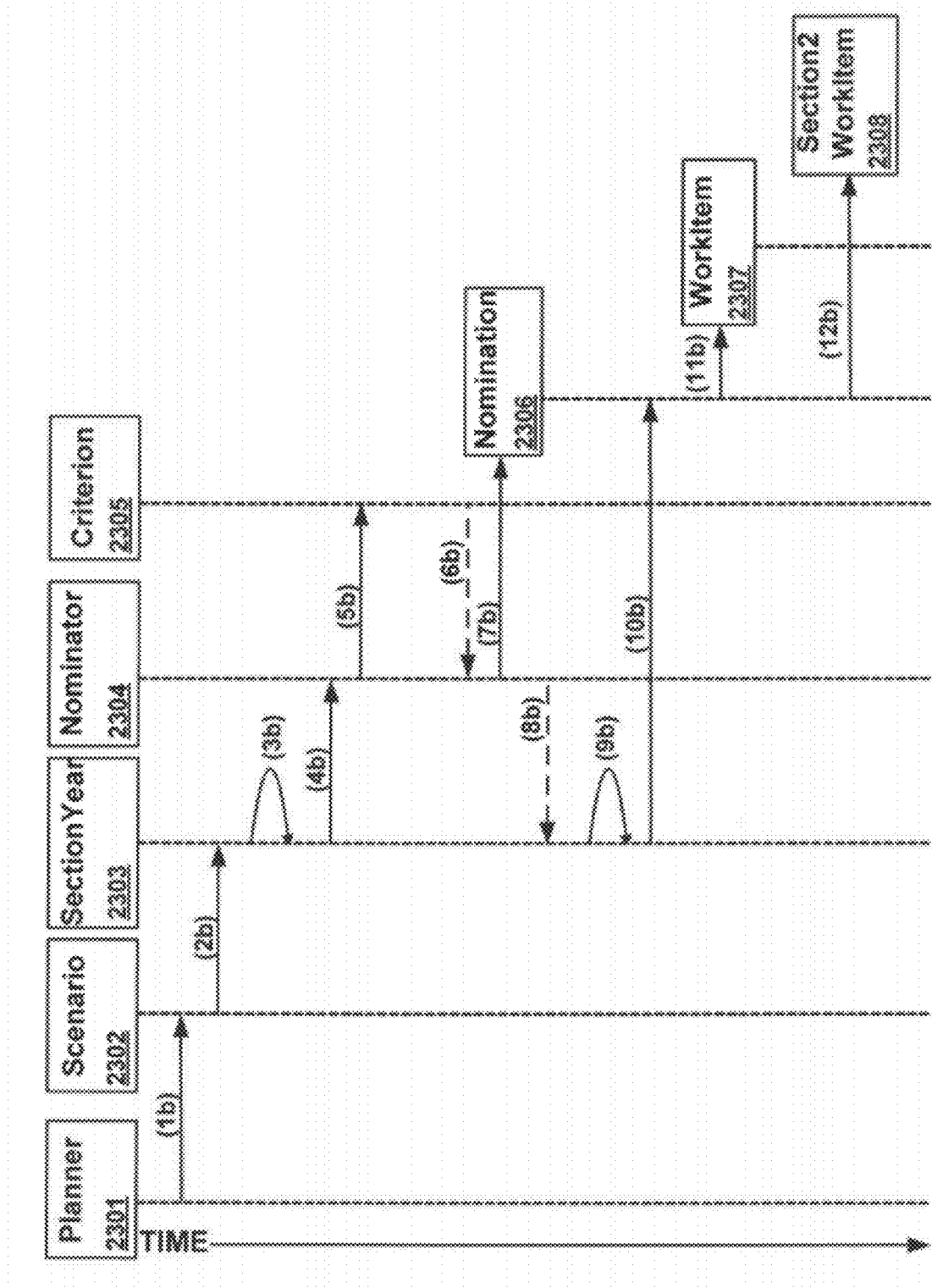
FIG. 23 is a UML Sequence Diagram showing how a basic work plan structure operates during planning facilitated by select embodiments of the present invention.

Refer to FIGS. 22 and 23. FIG. 23 depicts how the basic time-sequenced work plan structure operates during planning facilitated by select embodiments of the present invention. Planning is initiated by the Planner function 2301 made available via the IWorkPlanner interface 2201 that is normally triggered by a user. The Planner function 2301 queries (1b) the Scenario function 2302, made available via the IPlanningScenario interface 2204, to automatically develop the plan. A user specifies the plan start date and duration of the planning period, e.g., a fiscal year.

In select embodiments of the present invention, the Scenario object 2302, in turn, queries (2b) the SectionYear object 2303 for each section, such as a pavement section, and iterates (3b) for each Section-Year object 2303 that a user has inputted. The Scenario object 2302 then locates the appropriate IPlanSectionYear interface 2207 for that year, and instructs the software to prepare a plan "automatically." In select embodiments of the present invention, the set of available sections, such as pavement sections, is specified as those accessible via the Planner function 2301.

The SectionYear object 2303 first determines what the condition of the specified section is predicted to be at the requested date based on the stored condition state for each specified section, such as a pavement section, and the prediction family to which each specified section is assigned.

The SectionYear object 2303, in turn, queries (4*b*) the Nominator object 2304 made available via the IWorkNominator interface 2209 and iterates through the set of nominators in the requests that the Nominator object 2304 nominates for each specifically identified section by year.

The Nominator object 2304, in turn, queries (5*b*) the Criterion object 2305, made available via the INominationCriterion interface 2210, whether criteria are met for each of the identified sections for that planning year.

In select embodiments of the present invention, the Criterion object 2305 returns (6*b*) a Criterion Met response as either true or false. The return (6*b*) must be true to continue with the description as shown in FIG. 23. That is, if any return is false, the nomination process stops for this nomination of the Nominator object 2304 for the specified section and year. If all criteria return (6*b*) true, the Nominator object 2304 creates (7*b*) a nomination in the Nomination object 2306 via the INomination interface 2208 for the corresponding work type for each given section and year. In select embodiments of the present invention, the estimated cost of the work (not shown separately in FIGS. 22 and 23) is also computed at this step. In select embodiments of the present invention, the nomination is returned (8*b*) to the SectionYear function 2303 by the Nominator function 2304 while also adding the nomination to the collection of nominations in the Nomination function 2306.

In select embodiments of the present invention, appropriate engineering logic is applied (9*b*) by the SectionYear object 2303 to determine whether any of the suggested nominations from the Nomination object 2306 should be ignored. An example of appropriate engineering logic is that if both Major M&R and Localized Preventive M&R are nominated, only the Major M&R will be asserted because doing major work removes the necessity for local work. In select embodiments of the present invention, the SectionYear object 2303 then calls (10*b*) Assert on any remaining nominations, clearing the way for further processing.

In select embodiments of the present invention, each asserted nomination from the Nomination object 2306 creates (11*b*) a WorkItem object 2307 describing the type of work to be done. In select embodiments of the present invention, each asserted nomination from the Nomination object 2306 also creates (12*b*) a section to work item in the Section2WorkItem object 2308 that establishes the relationship between the particular section, the WorkItem object 2307, and the Scenario object 2302.

Thus, in select embodiments of the present invention, the basic structure and the flow the structure supports is the Scenario object 2302 to the SectionYear object 2303 to the Nominator object 2304 to the Criterion object 2305 and then to the Nomination object 2306. Further, the nominations are evaluated to determine what work in the WorkItem object 2307 is needed and what section is nominated for the work item recommended in the Section2WorkItem object 2308. This method is powerful and useful for a variety of planning situations.

Select embodiments of the present invention support three different planning tools: Condition Analysis, Work Planning and Inspection Schedule (all not shown separately in FIGS. 22 and 23). The Condition Analysis tool calculates and displays the condition of basic structural elements, such as pavement sections, over time. The Work Planning tool recommends maintenance and repair actions. The Inspection Schedule tool specifies criteria to optimize inspection schedules. A further advantage of select embodiments of the present invention is that embodiments may be used to implement, not just support, all three of these tools.

In select embodiments of the present invention, the Condition Analysis tool may be initiated as a scenario by employing the Scenario object 2302 with no work nominators. This results in an output describing only the condition of each pavement section as predicted over time, i.e., no work is scheduled. This provides an output of a simple condition analysis as discussed previously.

In select embodiments of the present invention, the Work Planning tool may be applied to basic work planning by initiating the Scenario object 2302 with two sequential scenarios: an All Work scenario that contains nominators for Major, Global and Localized Preventive and Localized Safety (Stop-Gap) M&R work, i.e., all of the work types recognized by select embodiments of the present invention, and a Budget scenario that uses an All Work scenario as a base. An inspection schedule may be developed by employing a single nominator from the Nominator object 2304, nominating one work type, i.e., inspections. A user may select the criteria attached to this nominator to yield an inspection schedule driven solely by meeting the criteria.

In select embodiments of the present invention, a detailed optimization algorithm may employ a prioritization scheme, facilitating the basic work planning mechanisms as described previously. A conventional algorithm for budget optimization may just sort recommended work in priority order, marking items unfunded upon depletion of the budget. However, this simple apppach may not satisfy management requirements. Note that accomplished work impacts the relevande of later planned work. For example, if Major M&R is accomplished for a pavement section in an early year, Stop-Gap Localized M&R will not be needed on that pavement section at the same time as it would if Major M&R had not been done. Conversely, if Major M&R is not done early, Stop-Gap Localized M&R must be planned earlier than it would have if Major M&R had been done. Further, all high-priority items may not be able to be funded in a given budget year. If the highest-priority Major M&R is greater than the total budget for a given year, the Major M&R preempts all lower-priority work given that one considers only priority. Thus, a top-down algorithm does not address program changes induced by not funding an M&R project. For example, if Major M&R is not funded in a planning year then Localized Stop-Gap events must be scheduled. Further, neither simple bottom-up nor top-down approaches address the practical situation. Therefore, a better approach is to optimize the budget one year at a time.

To address this dilemma, select embodiments of the present invention identify a category of Required Work that a user specifies at the start of a plan. Required Work is always funded within the method even if it causes a planner to exceed budget. Also, in select embodiments of the present invention, it is optional to charge Required Work against the budget.

In select embodiments of the present invention, an M&R Budget may be optimized and prioritized by project. In select embodiments of the present invention, the prioritization scheme emphasizes budget optimization. This is achieved by giving the highest priority to preventive M&R. The exception is Localized Safety (Stop-Gap) M&R that should be performed, for the example of pavements, only when the PCI is below the Critical PCI and there are no funds to perform. Major M&R. Thus, in select embodiments of the present invention, the first factor considered in budget prioritization is the M&R category. Historically, the order in which M&R categories are prioritized for pavement is Localized Safety (Stop-Gap), Localized Preventive, Global Preventive, Major Above Critical PCI, and Major Below Critical PCI.

In a situation where the available M&R budget is "unlimited", there is no need for prioritization. In this unrealistic case, M&R spending is optimized by using the M&R section assignment described above. When the M&R budget is limited (i.e., less than that needed to perform all optimum M&R), then optimization and prioritization are necessary to achieve maximum return on investment. Certain projects must be performed regardless of budget optimization. This may be due to functional requirements (e.g., user cost), mission objectives (e.g., increase in traffic loading), and in some cases, political and social pressure.

Figure 24:
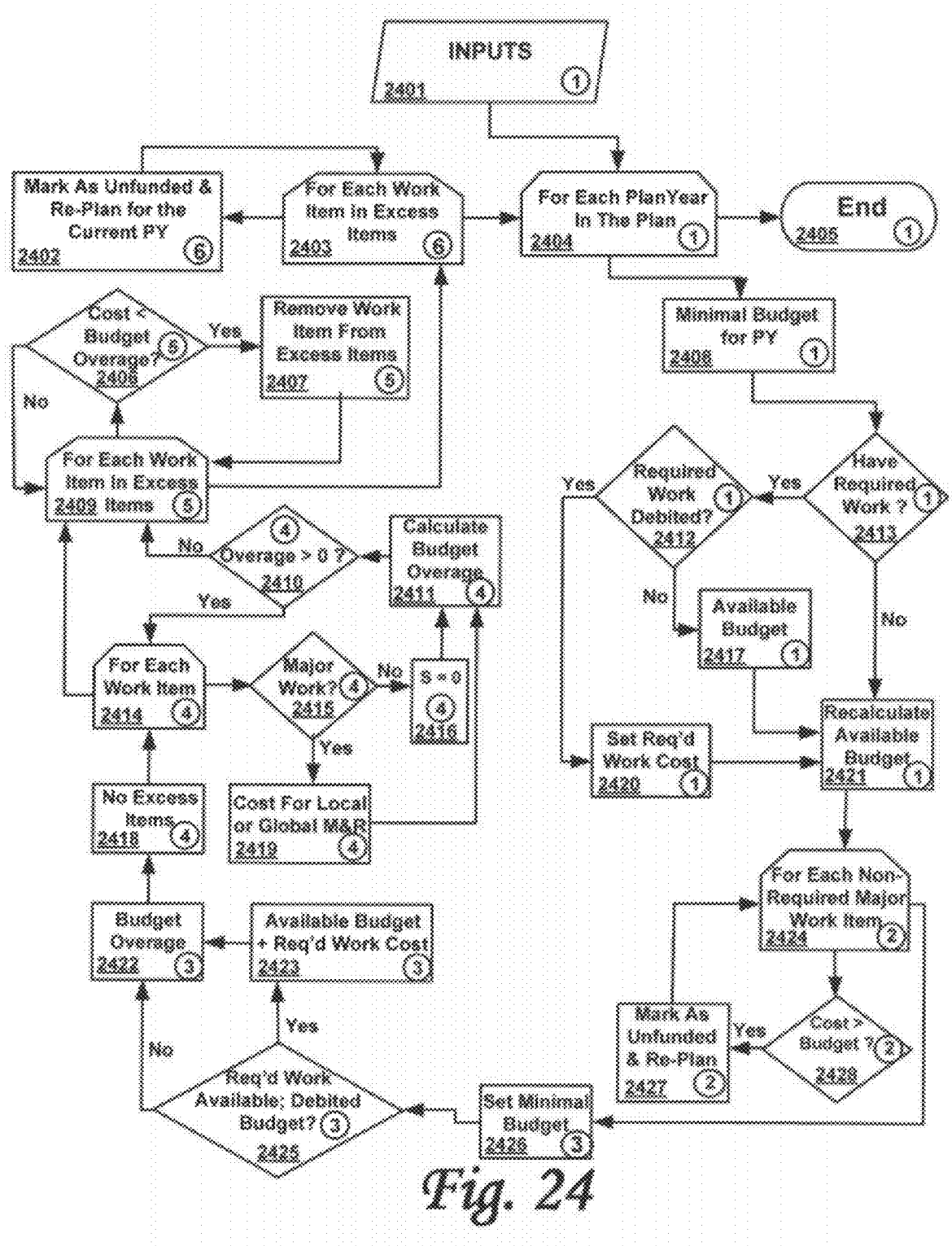
FIG. 24 is a flow chart for a budgeting algorithm used in select embodiments of the present invention.

Refer to FIG. 24, depicting a flow chart for a budgeting algorithm used in select embodiments of the present invention by the Work Plan. The circled numbers identify the six sub-loops of the main loop. The main loop may be allowed to iterate over each year of a multi-year plan.

In select embodiments of the present invention, the inputs 2401 (in sub-loop 1) include a list of nominated work items for each basic structural element, such as a pavement section, and planning year, as produced by the nomination algorithm of FIG. 22. The algorithm of FIG. 24 associates a budget that specifies the funding available for nominated work items for each year.

In select embodiments of the present invention, the main loop of the algorithm represented in FIG. 24 iterates over the years specified in the plan, starting with the first year. This loop encompasses all of the sub-loops 1 through 6 (as labeled in each of the blocks 2401-2428).

In select embodiments of the present invention, For Each Plan Year (PY) in the Plan 2404, a Minimal Budget is computed 2408. Based on the existence of Required Work 2413 and whether any Required Work is debited Yes, the Available Budget 2417 for Major M&R is computed. If the Required Work is debited Yes to the budget then the Available Budget 2417 is updated by subtracting the Set Cost of Required Work 2420 to Recalculate Available Budget 2421. If the Required Work is not debited No to the Available Budget 2417, Recalculate Available Budget 2421 as existing Available Budget 2417 plus cost of the Required Work. If there is no Required Work, the Recalculated Available Budget 2421 is calculated by simply subtracting Minimal Budget 2408.

In select embodiments of the present invention, Sub-loop 2 2424, 2428, 2427 eliminates those items of Major Work whose cost is greater than the Re-Calculated Available Budget 2421. For Each Non-Required Major Work Item 2424, a query 2428 is made as to whether its cost is greater than the Re-Calculated Available Budget 2421. If Yes, then that Non-Required Major Work item is Marked as unfunded 2427 and Sub-loop 2 iterates until all Non-Required Major Work items for the planning year have been addressed, at which time a Minimal Budget is set 2426, thereby initiating Sub-loop 3.

After completing Sub-loop 2 iterations, Sub-loop 3 is entered by setting a Minimal Budget 2426, then querying if there is Required Work available and, if so, if it is Debiting To The Budget 2425. If Yes, then the Set Minimal Budget 2426 is updated by adding the cost of the Required Work 2423 to the Set Minimal Budget 2426. If No, then a Budget Overage is calculated 2422 by subtracting the Set Minimal Budget 2426 from the Total Expenditure, (the total amount of all planned work). Sub-loop 3, 2422-2426 then sets the Excess Items list to empty as a prelude to entering sub-loop 4 at No Excess Items 2418.

In select embodiments of the present invention, Sub-loop 4 calculates Budget Overage 2411, if any, after all items of Major Work have been eliminated. Sub-loop 4 generates a list of candidate items of Major Work to be eliminated by moving (considering those in order) from low priority to high priority work items For Each Work Item 2414 on a nominated work list (not shown separately). Queries 2415 are made to determine if a work item is an item of Major Work. If Yes, then the cost to do either Local or Global Preventive M&R for this planning year is retrieved 2419 and input to a Budget Overage calculation 2411. If No, then the algorithm sets the cost to do Local or Global Preventive M&R (as appropriate) to zero 2416 and inputs the unaltered result to a Budget Overage calculation 2411. A query 2410 is then made to determine if the Budget Overage 2422 is greater than zero. If yes, then at least one more iteration of Sub-loop 4 is made. If no, Sub-loop 4 terminates since sufficient low priority Un-Required Work has been eliminated to meet budget.

In select embodiments of the present invention, Sub-loop 5 addresses items previously unfunded that should now be considered since expensive high priority work items have been eliminated in prior sub-loops. For Each Work Item in Excess Items 2409 passing from Sub-loop 4, query whether cost of the work is less than 2406 the Budget Overage 2422. If Yes, then that Work Item is Removed From the Excess Items list 2407 and the next excess item is called up and Sub-loop 5 is iterated until exhaustion of excess items. If No, then For Each Work Item in Excess Items 2403 is passed to Sub-loop 6.

In select embodiments of the present invention, the $6^{th}$ and final sub-loop eliminates the excess work items using the same method as initiated at 2427 as described below. That is, it marks the excess work item as unfunded 2402 and re-plans the M&R for that basic structural element, such as a pavement section, for the current planning year, iterating through all work items with excess items and iterating the entire main loop For Each Plan Year In The Plan 2404 prior to termination 2405.

For select embodiments of the present invention, capacity exists to mark items unfunded (unaffordable) and re-plan the corresponding basic structural elements, such as pavement sections, as at 2427, 2402. This ability follows from the structure presented in FIGS. 22 and 23 because the budget limiting scenario is separate from the work nominating scenario and because the work nominating scenario iterates first over basic structural elements, such as pavement sections, then over budget years. To deal with unfunded items, a budget limiting scenario imposes a constraint on the particular type of work that should not be funded. A budget limiting scenario may then ask the work nominating scenario to re-plan the given basic structural element, such as a pavement section, for the given year and subsequent years.

In select embodiments of the present invention, the concept of a constraint on nominations may be employed. For example, a constraint may assert that certain types of work are forbidden for certain basic structural elements, such as pavement sections, or in certain years, or both. The constraints are checked between steps (6b) and (7b) of FIG. 23. Thus, before nominating work, the Nomination object 2306 and the IWorkNominator interface 2209 (FIG. 22) must insure not only that positive criteria are met but that there exist no criteria against the nomination, i.e., applicable existing constraints. In select embodiments of the present invention, other constraints include minimum intervals between Required and Planned Work, as well as between different work types (e.g., it does not make sense to do localized repair on a section that is receiving Major M&R in that same year).

In select embodiments of the present invention these constraint criteria may be used for optimizing budgets. When a budgeting algorithm calculates that funds are not available for some M&R for a basic structural element, such as a pavement section, in a particular year, a constraint criterion is inserted to that effect. Then the same planning strategy is iterated as for the initial Work Plan. Thus new work is planned by including the impact of the added constraint. All changes in condition are propagated into later years, altering the Work Plan for those later years.

Although the Delay Penalty equation of the prior art as described above is straightforward, implementation of these calculations in practice may not be without complications when employing the design outlined by FIGS. 22-24, in particular, employing constraints as described above. Thus, using all of the capacity of select embodiments of the present invention provides an efficient and effective way to determine a Delay Penalty as may be seen by consideration of the procedure outlined in FIG. 25.

Figure 25:
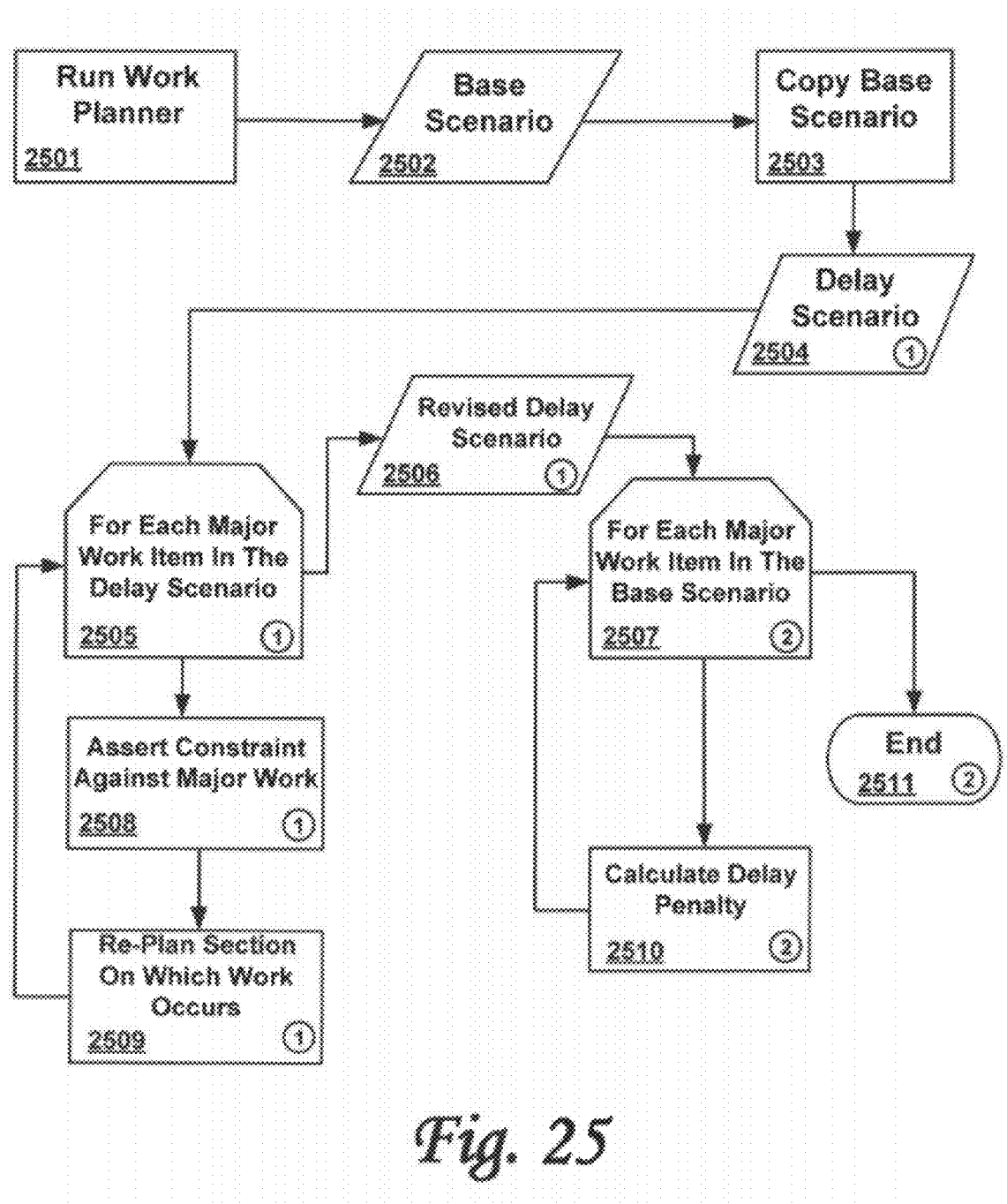
FIG. 25 is a flowchart of an efficient algorithm for calculating Delay Penalty as used in select embodiments of the present invention.

Refer to FIG. 25, a flowchart used in implementing select embodiments of the present invention. The flowchart outlines an efficient algorithm for calculating a Delay Penalty. In select embodiments of the present invention, the main loop of the algorithm iterates over the years specified in a user's plan, starting with the first year. This loop encompasses both of the Sub-loops 1 and 2 (as labeled in each of the blocks 2504-2511). The algorithm is initiated by running the Work Planner 2501 to establish a Base Scenario 2502, then copying the Base Scenario 2503. A first Sub-loop 1 is run, starting with a Delay Scenario 2504 For Each Major Work Item in the Delay Scenario 2505 of Sub-loop 1 and iterating through all the Major Work items in the Delay Scenario 2504 of Sub-loop 1.

For each of these Major Work items in Sub-loop 1, a Constraint Against Is Asserted 2'508, each constraint prohibiting Major Work on the corresponding section for the delay period of Sub-loop 1. Work is Re-Planned for Sections on Which Work Occurs 2509 in Sub-loop 1. This initiates scheduling of new Localized Preventive M&R for each Major Work item originally scheduled but now included in the delay interval, while also including a new schedule for the constrained Major M&R at the end of the delay interval.

At the end of Sub-loop 1, a Revised Delay Scenario 2506 is available as input to Sub-loop 2 For Each Major Work Item in the Base Scenario 2507. In Sub-loop 2, a Delay Penalty is calculated 2510 For Each Major Work Item In The Base Scenario 2507 by comparing the Base Scenario 2502 to the Delay Scenario 2504 for each Major Work item in the Base Scenario 2502. After all Major Work items are addressed, Sub-loop 2 is terminated 2511 with resultant Delay Penalty values for each Major Work item provided.

The algorithm represented in FIG. 25 is efficient because it allows a user to Copy (the) Base Scenario 2503 rather than planning a new scenario. Further, this algorithm does new planning only for basic structural elements, such as pavement sections, scheduled for Major M&R. For these pre-specified elements, the algorithm requires minimal processing because it only Asserts (a) Constraint Against Major Work 2508 and then Re-Plans (any) Section on Which Work Occurs 2509 over that constraint interval.

The budgeting process and algorithm detailed in FIG. 25 optimizes work given a fixed budget. It is also useful to determine budget requirements during a specified period of time, given Required Work. Common objectives include: eliminating backlog of Major M&R events; maintaining current area-weighted condition index, such as a PCI, attaining a desired area-weighted condition index, and the like.

Select embodiments of the present invention calculate budget requirements by iterating a budget consequence analysis and using a binary search, e.g., to find the smallest budget that will accomplish a user's required objectives. A search considering possible annual budgets may be executed to determine a maximum for a search range by running an unlimited budget plan and using the largest single-year expenditure of that plan as the upper limit.

Figure 26:
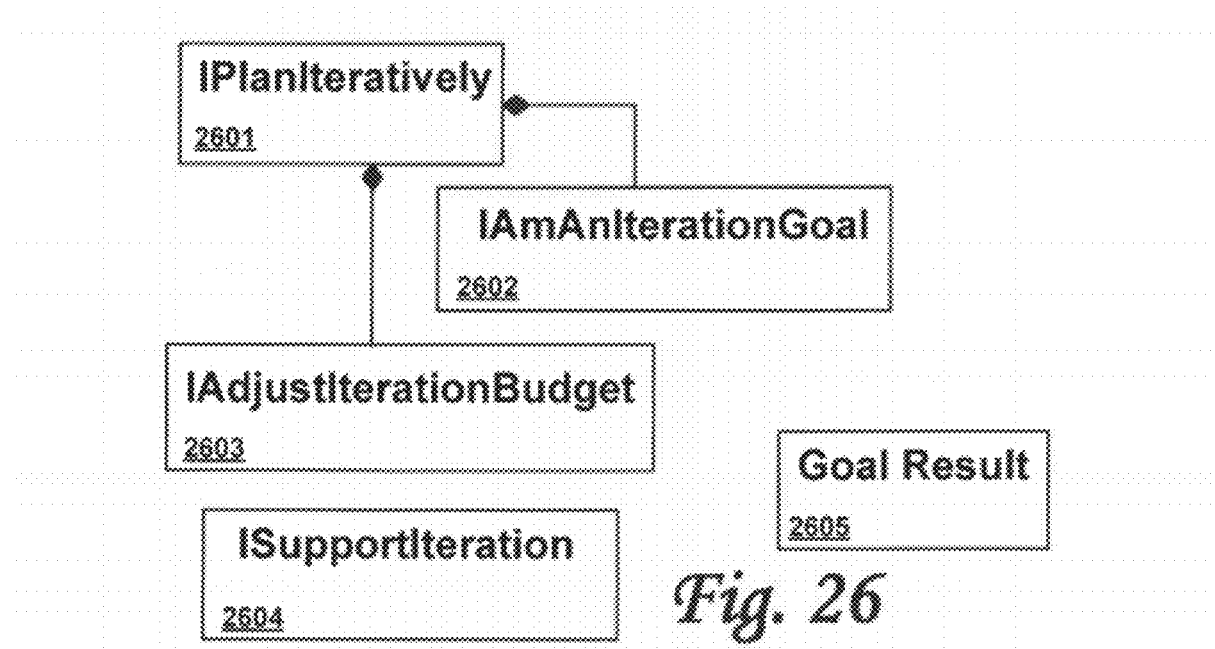
FIG. 26 illustrates a general framework for performing budget requirements analysis as may be uses with select embodiments of the present invention.

Refer to FIG. 26 depicting a general structure for performing budget requirements analysis as may be used with select embodiments of the present invention. The first interface is IPlanIteratively 2601 that has an implementation of IAmAnIterationGoal 2602 and an implementation of IAdjustIterationBudget 2603. The IPlanIteratively interface 2601 is implemented by a class that controls the search for a budget that matches a user's requirements. The IAmAnIterationGoal interface 2602 is implemented by a class that corresponds to a management goal. The IAdjustIterationBudget interface 2603 is used by the IPlanIteratively interface 2601 to determine the budget to be tried on the next iteration. The ISupportIteration interface 2604 is invoked by the IPlanIteratively interface 2601 to do actual planning. An implementation of the IAmAnIterationGoal interface 2602 is used by the IPlanIteratively interface 2601 to make available for evaluation the results of planning and to determine the relationship between the Goal Result 2605 and the desired goal.

In select embodiments of the present invention, the structure of FIG. 26 supports a variety of different goals and planning approaches while delivering a Goal Result object 2605 (budget) that matches a user's goals. The structure of FIG. 26, coupled with the operations of FIG. 27, provides a unique, yet general, way to implement budget requirements analysis.

Figure 27:
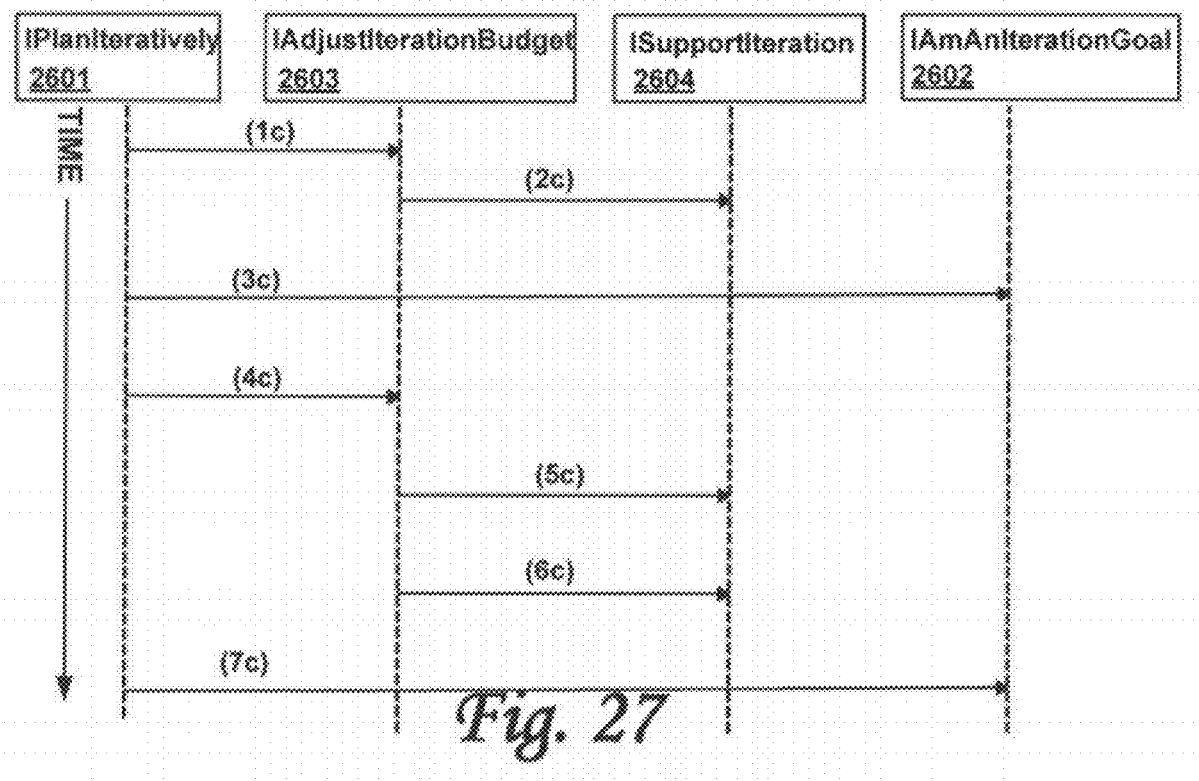
FIG. 27 illustrates the operation of the budget requirements structure of FIG. 26.

Refer to FIG. 27, illustrating the operation of the structure of FIG. 26. An IPlanIteratively implementation 2601 queries (1c) the IAdjustIterationBudget interface 2603 to prepare for iteration. In turn, the IAdjustIterationBudget implementation 2603 calls (2c) the ISupportIteration 2604 interface to plan work without restrictions, i.e., with unlimited budgets. The IPlanIteratively implementation 2601 then queries (3c) the IAmAnIterationGoal interface 2602 to evaluate the results of the unlimited budget planning. If the work goal is not reached, the iteration aborts because the work goal is not attainable even with an unlimited budget. If the work goal is reachable, the IPlanIteratively implementation 2601 then queries (4c) the IAdjustIterationBudget interface 2603 whose implementation, in turn, queries (5c) the ISupportIteration interface 2604 to set an initial budget. After setting an initial budget, the IAdjustIterationBudget implementation 2603 queries (6c) the ISupportIteration interface 2604 to iterate the plan using the budget set at (5c). The IPlanIteratively implementation 2601 then queries (7c) the IAmAnIterationGoal interface 2602 to evaluate the results of this planning. If further iterations are desired, e.g., the goal is not achieved, the goal is achieved and it is possible to decrease cost, and the like, another iteration begins with a query (4c) from the IPlanIteratively implementation 2601 to the IAdjustIterationBudget interface 2603. Otherwise, iteration terminates.

Select embodiments of the present invention allow users to plan and budget projects based both on Required Work and Recommended Work, both as specified by the user. Upon completion of work, work history data are automatically updated In summary, select embodiments of the present invention facilitate interactive project formulation as part of work planning and budget optimization. The penalty cost for Major Work may be determined down to the basic element, such as a pavement section, and to the project level.

The abstract of the disclosure is provided to comply with the rules requiring an abstract that will allow a searcher to quickly ascertain the subject matter of the technical disclosure of any patent issued from this disclosure. 37 CFR §1.72

(b). Any advantages and benefits described may not apply to all embodiments of the invention.

While the invention has been described in terms of some of its embodiments, those skilled in the art will recognize that the invention can be practiced with modifications within the spirit and scope of the appended claims. For example, although the system is described in specific examples for managing pavements, it may be used for any type of construction and thus may be useful such diverse applications as railroads, transcontinental pipelines, marine structures, educational campuses, military installations, and the like. Performance of these structures may be tracked, maintenance scheduled and budgeted, and computer modeling of virtual systems done using select embodiments of the present invention. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Thus, it is intended that all matter contained in the foregoing description or shown in the accompanying drawings shall be interpreted as illustrative rather than limiting, and the invention should be defined only in accordance with the following claims and their equivalents.

We claim:

1. A method to efficiently-automate and update automatically a decision support process, specifically facilitating at least interactive project formulation for infrastructure at multiple component levels, comprising:
    employing at least one specially configured computer; and
    implementing an Infrastructure Management Methodology (IMM) on computer readable medial allowing operable communication with said specially configured computer for:
        establishing at least one multi-level database on computer readable media for at least capturing inventory properties of said multiple component levels, said multi-level database comprising at least that data describing, via at least one multi-functional interface to at least one user, budgets, work plans, properties of structural elements and components of said infrastructure, condition assessments of said infrastructure as developed at least from inspections of said infrastructure and descriptions of work performed on said infrastructure;
        storing said data as historical data only each time changes are made to said data, said data manipulated and accessed by said user via inputs allowing operable communication with said specially configured computer;
        storing properties of said infrastructure that are existing at an inspection in said multi-level database at each said inspection,
    wherein each category of said properties is stored at only one level in said multi-level database, said properties in each said stored category being shared from said one level with all other levels within said multi-level database;
        providing models implemented by algorithms on computer readable media, said models allowing operable communication with said multi-level database, said models incorporating scenarios, each said scenario defining at least one purpose;
        maintaining said multi-level database by updating with at least changes to said work plan, said budget, said properties, said results of inspections and completed work;
        establishing condition prediction relationships at least as family curves; establishing definitions for said condition prediction relationships, said relationships and definitions contained on computer readable media, while maintaining the option for said user to define at least some said prediction relationships and parameters related thereto via inputs allowing operable communication with said specially configured computer;
        employing a condition index in said prediction relationships that includes a value defined as the Critical Condition Index, said Critical Condition Index employed in at least one said algorithm to facilitate quantification in said decision support process;
    defining and storing projects for maintenance and repair (M&R) of said infrastructure on computer readable media;
        establishing, optimizing and updating at least one work plan contained on computer readable media;
        establishing, optimizing and updating at least one budget contained on computer readable media;
        iterating said Work Plans employing modified said condition indices and said prediction curves necessary to at least account for said work performed and said results of said inspections, optimizing scheduling of inspections of said infrastructure via inputs allowing operable communication with said specially configured computer;
        employing a single interface to support multiple condition prediction engines and multiple family types;
        employing constraints stored on computer readable media;
        iterating at least one said algorithm;
        incorporating said user-defined projects via inputs allowing operable communication with said specially configured computer prior to executing said Work Plan; and
        employing said data obtained from implementing said IMM to plan, budget, schedule and execute M&R work,
    wherein said method provides data for use in making decisions about said M&R, said data accessible in multiple formats, at least one said format of which is available on a display in operable communication with said specially configured computer, and
    wherein said method enables consideration of the effect of the status of current projects on future work, and
    wherein said method optimizes said budget one year at a time.

2. The method of claim 1 further comprising estimating, via inputs allowing operable communication with said specially configured computer, at least a last construction date from current said inspection data and last known said condition assessment,
    wherein said last construction date, if within pre-specified confidence limits, is used at least in part to create a specific said condition prediction relationship.

3. The method of claim 1 further comprising estimating, vputs allowing operable communication with said specially configured computer, at least a last construction date from an assigned said family curve and last known said condition assessment, wherein said last construction date, if within pre-specified confidence limits, is used at least in part to create a specific said condition prediction relationship.

4. The method of claim 1 in which said interfaces are represented as screens on said display, said screens accessible and editable via inputs allowing operable communication with said specially configured computer by said user, a single said screen able to access multiple said algorithms and models implemented on said specially configured computer, wherein a single said screen supports multiple engines for asserting said condition prediction relationships and said family types, and wherein said single screen is independent of said engine and type of said model employed.

5. The method of claim 1 at least one said algorithm implemented on said specially configured computer employing as one constraint Required Work as defined by said user.

6. The method of claim 1 at least one said algorithm implemented on said specially configured computer employing as one said constraint a fixed budget as defined by said user.

7. The method of claim 1 said scenarios implemented on said specially configured computer comprising at least a budget limiting scenario and a work nominating scenario, wherein said budget limiting scenario is independent of said work nominating scenario, and, wherein said work nominating scenario iterates first over said structural elements and components then over budget years.

8. The method of claim 1 said Infrastructure Management Methodology (IMM) on said computer readable media incorporating at least models implemented on said specially configured computer comprising:

at least one Inventory and Work History model;

at least one Inspection model in operable communication with said inventory and work history model;

at least one Condition Assessment model in operable communication with said inspection model;

at least one Condition Prediction Model in operable communication with said condition assessment model;

at least one Condition Analysis and Work Planning model in operable communication with said Condition Prediction Model;

at least one Project Formulation model in operable communication with said Condition Analysis and Work Planning model, wherein said Project Formulation model may iterate with said Condition Analysis and Work Planning model based on requirements input by said user via inputs allowing operable communication with said specially configured computer;

at least one Project List model in operable communication with said Project Formulation model, wherein said Project List model may iterate with said Inventory and Work History model to re-cycle said method, based on requirements input by said user via inputs allowing operable communication with said specially configured computer, and wherein each said model is implemented by at least one said algorithm, running on said specially configured computer, permitting said user to at least examine alternatives via inputs allowing operable communication with said specially configured computer.

9. The method of claim 8 said infrastructure comprising pavement, said condition assessment of said pavement defined by a pavement condition index (PCI).

10. The method of claim 9 further comprising incorporating a measure of condition that is related to a threshold pavement condition termed a Critical PCI, wherein employment of at least one first said algorithm implemented on said specially configured computer is based on properties of said pavement when said PCI is above said Critical PCI and employment of at least one second said algorithm is based on properties of said pavement when said PCI is below said Critical PCI.

11. The method of claim 8 in which a third said algorithm running on said specially configured computer is a History Creation algorithm that at least captures the relationship between said inspections and said inventory properties at multiple levels of said infrastructure, wherein new history records are created only when some inventory property changes, and wherein recursive calls allow lower level said properties to be updated automatically when higher level said properties are changed, and wherein a lower level of inventory shares the same history record as at a higher level of inventory when said higher level has not changed.

12. The method of claim 8 in which a fourth said algorithm running on said specially configured computer is a Budget Creation algorithm, applied recursively over multiple planning years in a major loop comprising six sub-loops, each said sub-loop having a unique objective, comprising:

addressing required work and budget impact thereof in a first said sub-loop;

addressing non-required major work item in a second said sub-loop;

addressing available budget for required work in a third said sub-loop;

addressing each work item not found to be excess in a fourth said sub-loop;

addressing each work item in excess, given sufficient budget overage in a fifth said sub-loop; and identifying unfunded work items in excess items to be re-planned in the current planning year in a sixth said sub-loop.

13. The method of claim 8 in which a fourth said algorithm is a Project Formulation Interactive Work Planning Process implemented on said specially configured computer, comprising:

defining individual projects by a user via inputs allowing operable communication with said specially configured computer;

executing a Work Plan on said specially configured computer after said projects are defined, wherein said Work Plan output incorporates plans for executing the work and budgets for the work;

analyzing said Work Plan output via inputs allowing operable communication with said specially configured computer;

forming new projects based on said analyzing via inputs allowing operable communication with said specially configured computer;

recursively adding said new projects to said Work Plan via inputs allowing operable communication with said specially configured computer; and formulating a final Work Plan via inputs allowing operable communication with said specially configured computer, wherein said final Work Plan incorporates at least basic inventory data combined with inspection information, maintenance policies, maintenance costs, and predictions of future pavement condition, and wherein all factors used in determining M&R alternatives in said Work Plan may be configured by a user to reflect local management practices, and wherein said final Work Plan facilitates determining consequences of alternative budgets, and wherein said final Work Plan is used to determine alternative budgets needed to meet specific said M&R scenarios;

preparing a project list via inputs allowing operable communication with said specially configured computer; and inputting said project list to said IMM implemented via inputs allowing operable communication with said specially configured computer at said Inventory and Work History model;

revising a Critical PCI Method to operate with, and to be subservient to, said projects using a concept of "minimum work intervals" and a modified budgeting process;

wherein only a Global Preventive M&R event is indicated on said specially configured computer after Major M&R, and wherein said project-level analysis implemented via inputs allowing operable communication with said specially configured computer identifies specific types of work and associated costs in sufficient detail to support development of contract documents.

14. The method of claim 8 in which a sixth said algorithm implemented via inputs allowing operable communication with said specially configured computer, efficiently calculates a Delay Penalty starting with the first year a main loop of said sixth algorithm incorporating two sub-loops iterates over the years specified in a plan of said user, comprising:

initiating a Work Planner algorithm via inputs allowing operable communication with said specially configured computer, to establish a Base Scenario;

copying said Base Scenario on said specially configured computer;

initiating a first said sub-loop on said specially configured computer starting with a Delay Scenario for each Major Work Item in said Base Scenario;

iterating all said Major Work Items in said Delay Scenario;

asserting a constraint implemented via inputs allowing operable communication with said specially configured computer prohibiting major work for the delay period of said first sub-loop;

via inputs allowing operable communication with said specially configured computer, re-planning work on sections for which work occurs in said first sub-loop, wherein implementing said first sub-loop automates scheduling of new Localized M&R for each said Major Work Item originally scheduled but now included in the delay interval of said first sub-loop, and wherein a new schedule is determined via inputs allowing operable communication with said specially configured computer for constrained Major M&R at the end of said delay interval of said first sub-loop;

inputting via inputs allowing operable communication with said specially configured computer, a Revised Delay Scenario to said second sub-loop for each said Major Work Item in said Base Scenario;

calculating, using said specially configured computer, said Delay Penalty for each said Major Work Item in said Base Scenario by comparing on said specially configured computer said Base Scenario to said Delay Scenario for each said Major Work Item in said Base Scenario; and terminating on said specially configured computer said sub-loop 2 after all said Major Work Items are addressed, wherein said Delay Penalty values are provided on said specially configured computer for each said Major Work Item, and wherein said sixth algorithm implemented on said specially configured computer facilitates new planning only for basic structural elements scheduled for said Major M&R, and wherein said sixth algorithm implemented on said specially configured computer asserts constraints only against Major Work and then re-plans on said specially configured computer those elements on which work occurs over a constraint interval.

15. The method of claim 9 employing a framework implemented on said specially configured computer for relating various said component levels of said infrastructure to store, manipulate, and access historical properties of inventory, comprising:

when an inspection record is created via inputs allowing operable communication with said specially configured computer for an element of said infrastructure, pointing said inspection record at an appropriate record in a Section History table;

pointing to select first inventory properties stored once in a pre-specified History Table for a pre-specified level;

pointing to select second inventory properties stored once in a pre-specified History Table for a pre-specified second level;

pointing to select third inventory properties stored once in a pre-specified History Table for a pre-specified third level to efficiently address any future need for maintaining relationships between inspections and inventory properties.

16. The method of claim 10 in which a seventh said algorithm implemented on said specially configured computer suggests the type of M&R to be applied to pavement in cases where said PCI is greater than said PCI Critical, comprising:

verifying load-related distresses as loaded on said specially configured computer, wherein if said pavement is structurally deficient, then Major M&R should be applied; if structurally deficient, calculating the predicted cost of repair from a PCI vs. Unit Cost relationship curve that is also used to establish if there is any structural deficiency;

verify funds availability, and if funds are available applying said Major M&R in said Work Plan, and if funds are not available applying localized Preventive M&R in said Work Plan; and if not structurally deficient applying Preventive M&R in said Work Plan, wherein said Preventive M&R may be applied as either Localized or Global Preventive M&R.

17. An engineered management system for efficiently facilitating decision making for scheduling maintenance and repair (M&R) of infrastructure at the project level and permitting adjustments related directly to budget availability and optimization of available resources, comprising:

at least one specially configured computer;

an Infrastructure Management Methodology (IMM) contained on computer readable media accessible by a user via inputs allowing operable communication with said specially configured computer, said IMM for efficiently automating and updating automatically a decision support process to at least support defining projects for said M&R of said infrastructure;

at least one multi-level database in operable communication with said IMM and contained on computer readable media accessible by said user via inputs allowing operable communication with said specially configured computer for at least capturing data on inventory properties, said multi-level database comprising at least that data describing, via at least one multi-functional interface to a user, budgets, work plans, properties of said infrastructure, condition assessments of said infrastructure as developed at least from inspections of said infrastructure and descriptions of work performed on said infrastructure, wherein said data are stored as historical data only each time that changes are made to said data, said data manipulated and accessed by said user, and wherein properties of said infrastructure existing at an inspection are stored in said database at each said inspection, and wherein at least one category of said properties is stored at only one level in said multi-level database, said properties in each said stored category being shared from said one level with all other levels within said database, and wherein said at least one multi-level database is maintained with at least changes to said work plan, said budget, said properties, said results of said inspections and results of completed work;

models implemented on said specially configured computer by algorithms contained on computer readable media accessible by said user via inputs allowing operable communication with said specially configured computer, said models in operable communication with said at least one multi-level database, said models incorporating scenarios, each said scenario defining at least one purpose;

condition prediction relationships established at least as types of a family of curves and definitions for said condition prediction relationships, said relationships and said definitions contained on computer readable media accessible by said user via inputs allowing operable communication with said specially configured computer, wherein said user has the option of defining at least some said prediction relationships and parameters related thereto, and wherein said prediction relationships employ a condition index that includes a value defined as the critical condition index, said critical condition index employed in at least one said algorithm to facilitate said decision support process;

at least one Work Plan contained on computer readable media accessible to said user via inputs allowing operable communication with said specially configured computer, wherein said user accounts for work performed and inspections by iterating said work plans employing modified condition indices, employing constraints and prediction curves via at least one algorithm to at least account for said work performed and said results of said inspections; and at least one budget contained on computer readable media accessible to said user via inputs allowing operable communication with said specially configured computer;

a single multi-functional interface screen for facilitating said user to input at least parameters, constraints, custom condition indicators, and nominators, wherein said system supports multiple condition prediction engines and multiple said family types, and wherein said system provides data for use by said user in making decisions about said M&R, said data accessible in multiple formats, at least one said format of which is available on a display in operable communication with said specially configured computer, and wherein said system permits said user to incorporate user-defined projects prior to executing said Work Plan, and employs said data to plan, budget, schedule and execute M&R work, and wherein said system enables said user to consider the effect of the completion status of current projects on future work, and wherein said system allows optimization of said budget one year at a time.

18. The system of claim 17 further comprising remote access means to said system, said means for use by at least said user.

19. The system of claim 18 said remote access means further comprising the worldwide web.

* * * * *